(12) United States Patent
Kushida

(10) Patent No.: US 10,051,258 B2
(45) Date of Patent: Aug. 14, 2018

(54) IMAGE PROCESSING DEVICE, IMAGE PROCESSING METHOD AND IMAGE PROCESSING COMPUTER PROGRAM PRODUCT

(71) Applicant: SONY CORPORATION, Tokyo (JP)

(72) Inventor: Hidenori Kushida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 15/605,095

(22) Filed: May 25, 2017

(65) Prior Publication Data

US 2017/0264886 A1    Sep. 14, 2017

Related U.S. Application Data

(63) Continuation of application No. 15/002,059, filed on Jan. 20, 2016, now Pat. No. 9,667,945, which is a (Continued)

(30) Foreign Application Priority Data

Mar. 31, 2011 (JP) ................................. 2011-080386

(51) Int. Cl.
*H04N 13/00* (2018.01)
*G03B 35/08* (2006.01)
*H04N 13/02* (2006.01)

(52) U.S. Cl.
CPC ......... *H04N 13/0246* (2013.01); *G03B 35/08* (2013.01); *H04N 13/0007* (2013.01); (Continued)

(58) Field of Classification Search
CPC .......... H04N 13/0246; H04N 13/0007; H04N 13/0239; H04N 13/0257; H04N 13/0296; G03B 35/08
See application file for complete search history.

(56) References Cited

U.S. PATENT DOCUMENTS 4,418,993 A * 12/1983 Lipton ............... H04N 13/0239
                                                        348/E13.014
8,682,061 B2     3/2014 Matsui
                         (Continued)

FOREIGN PATENT DOCUMENTS

CN         101959020         1/2011
CN         101964918 A       2/2011
                     (Continued)

OTHER PUBLICATIONS

Office Action dated Jan. 20, 2015 to Japanese Patent Application No. 2011-080386, with English translation.
(Continued)

*Primary Examiner* — Michael Teitelbaum
(74) *Attorney, Agent, or Firm* — Oblon, McClelland, Maier & Neustadt, L.L.P.

(57) ABSTRACT

An image processing device, method and computer program product cooperate to make adjustments in detection area for image adjustment processing to when displacement adjustments have been made to a first or second imaging area. A detection area setting device sets a first detection area within a first imaging area and sets a second detection area in a second imaging area after a displacement adjustment is applied to at least one of the first imaging area and the second imaging area. The first detection area is an area used in image adjustment processing.

13 Claims, 11 Drawing Sheets

EXTRACTION AREA AND DETECTION AREA
OF IMAGE ACCORDING TO FIRST EMBODIMENT

Related U.S. Application Data continuation of application No. 13/579,072, filed as application No. PCT/JP2012/001818 on Mar. 15, 2012, now Pat. No. 9,282,318.

(52) U.S. Cl.
CPC ..... *H04N 13/0239* (2013.01); *H04N 13/0257* (2013.01); *H04N 13/0296* (2013.01)

(56) References Cited

U.S. PATENT DOCUMENTS

| | | | |
|---|---|---|---|
| 2011/0012998 A1 | 1/2011 | Pan | |
| 2011/0018969 A1 | 1/2011 | Tanaka | |

FOREIGN PATENT DOCUMENTS

| | | |
|---|---|---|
| JP | 8-317424 A | 11/1996 |
| JP | 11-98407 A | 4/1999 |
| JP | 2002-94977 A | 3/2002 |
| JP | 2002-214515 | 7/2002 |
| JP | 2002-218506 | 8/2002 |
| JP | 2003-52058 A | 2/2003 |
| JP | 2004-129186 | 4/2004 |
| JP | 2006-276743 A | 10/2006 |
| JP | 2007-006285 | 1/2007 |
| JP | 2010-252186 A | 11/2010 |
| JP | 2011-017754 | 1/2011 |
| JP | 2011-29700 A | 2/2011 |
| JP | 2011-39486 A | 2/2011 |
| JP | 2012-216979 A | 11/2012 |
| WO | WO 2011/024352 | 3/2011 |

OTHER PUBLICATIONS

Office Action dated Apr. 10, 2015 in Chinese Patent Application No. 201280000927.4 (in English).

Office Action dated Sep. 22, 2015 to Chinese Patent Application No. 201280000927.4, with English translation.

Office Action dated Jul. 12, 2016 in Japanese Patent Application No. 2015-148773, along with an English translation.

\* cited by examiner

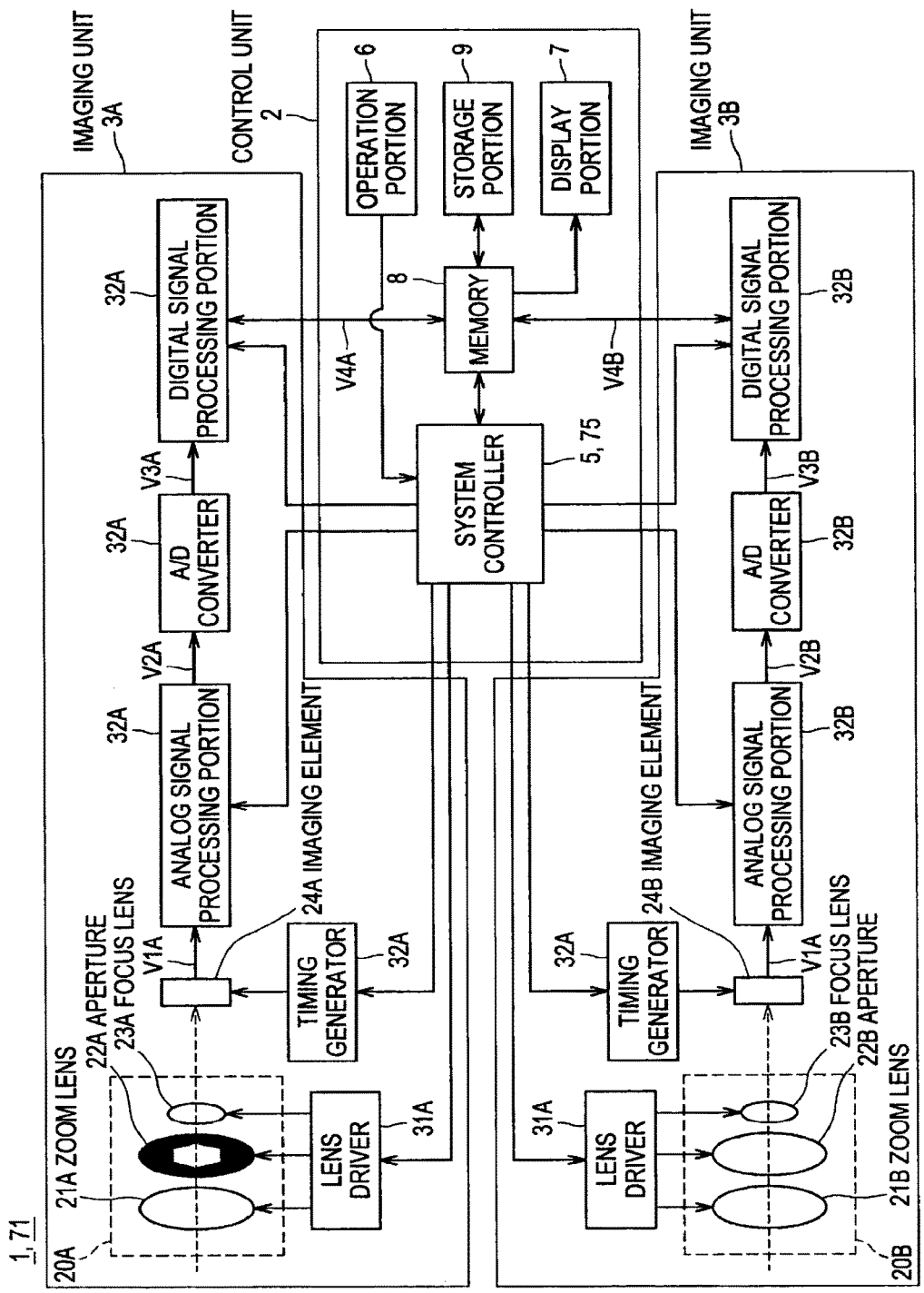
FIG. 1: OVERALL CONFIGURATION OF COMPOUND EYE IMAGING DEVICE

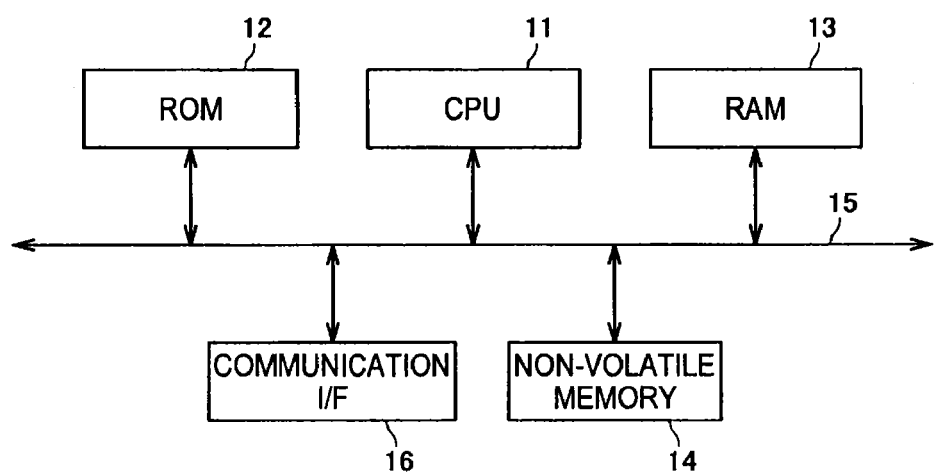
FIG. 2: HARDWARE CONFIGURATION OF SYSTEM CONTROLLER

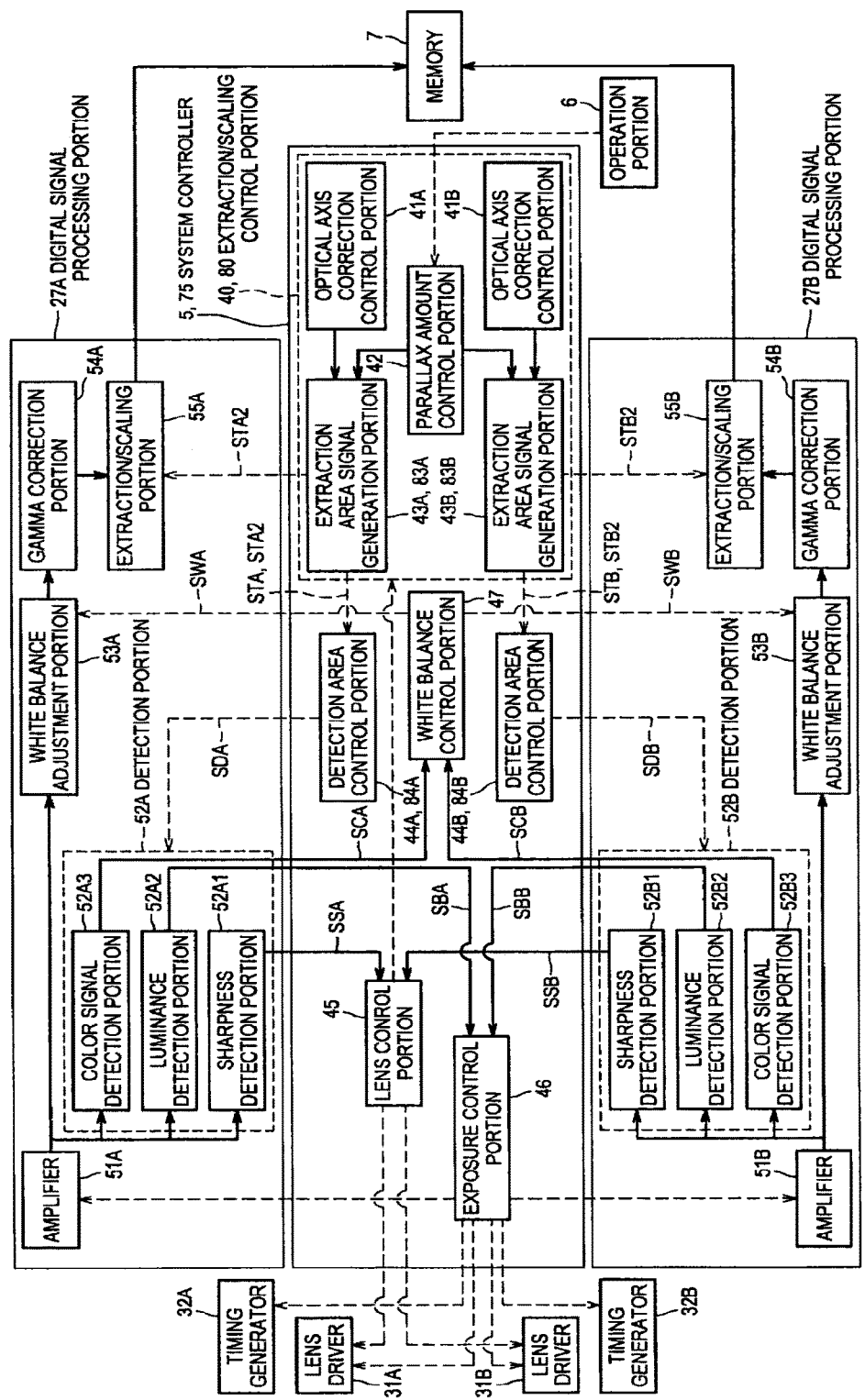
FIG. 3: FUNCTIONAL CONFIGURATION OF SYSTEM CONTROLLER AND DIGITAL SIGNAL PROCESSING PORTION

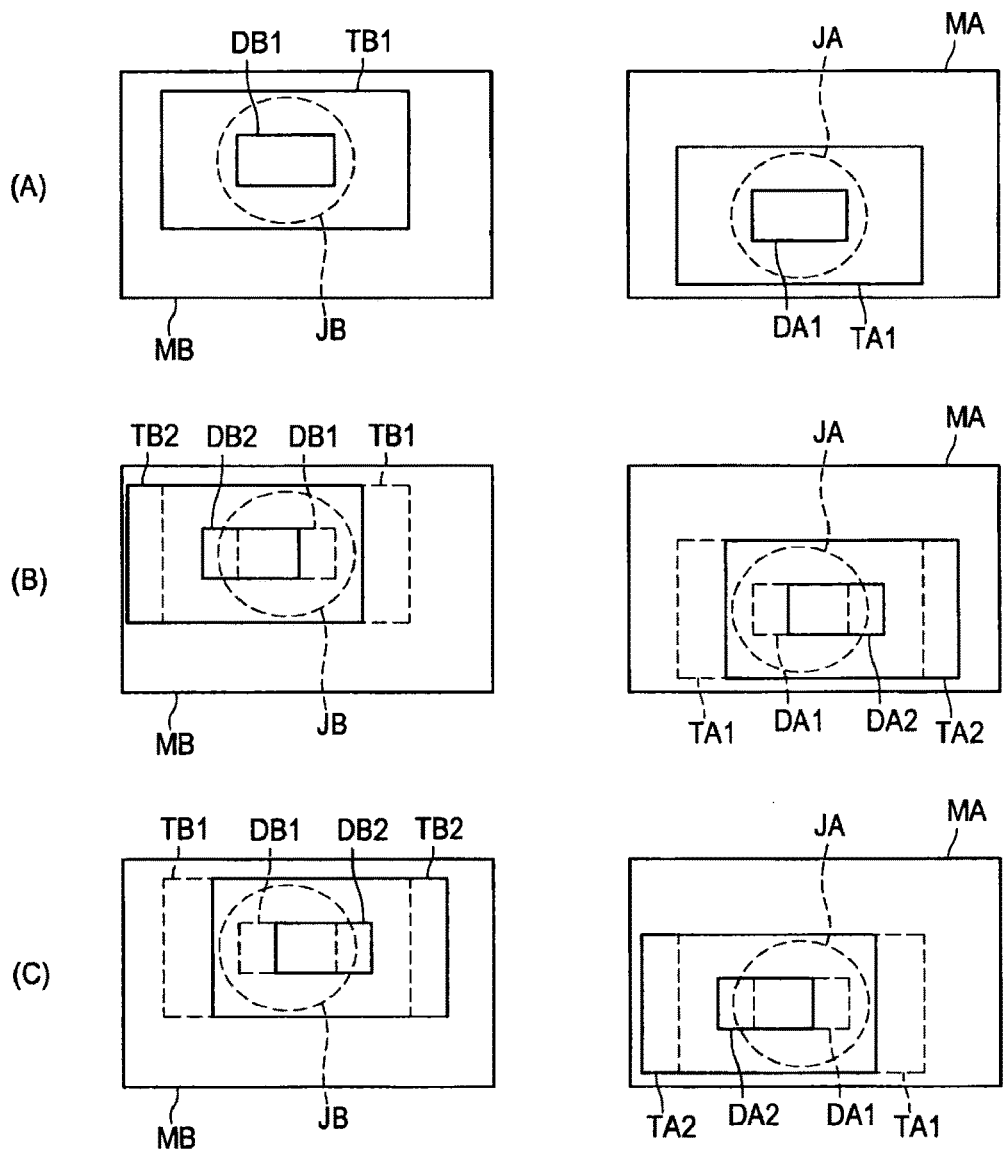
FIG. 4: EXTRACTION AREA AND DETECTION AREA OF IMAGE ACCORDING TO FIRST EMBODIMENT

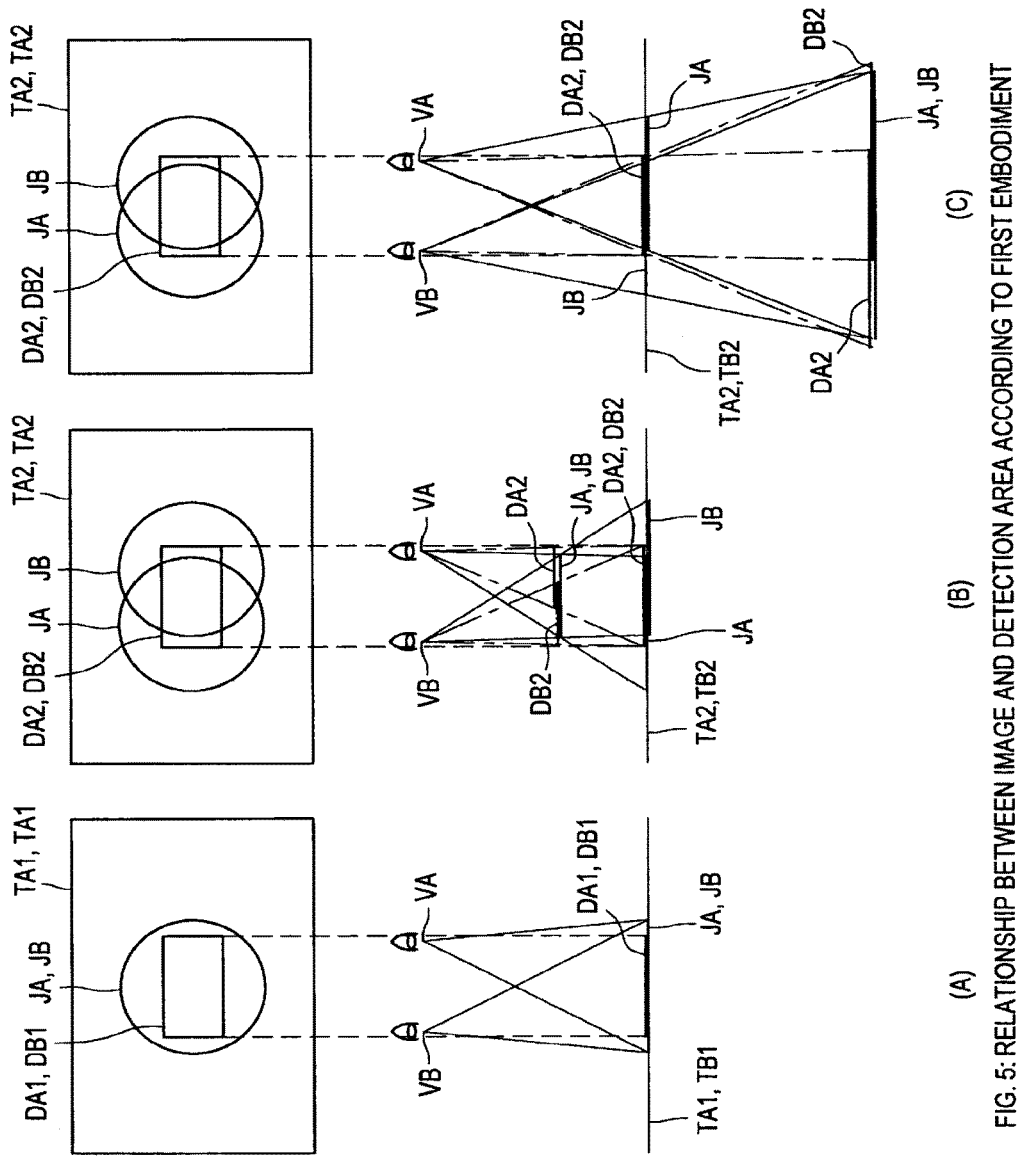
FIG. 5: RELATIONSHIP BETWEEN IMAGE AND DETECTION AREA ACCORDING TO FIRST EMBODIMENT

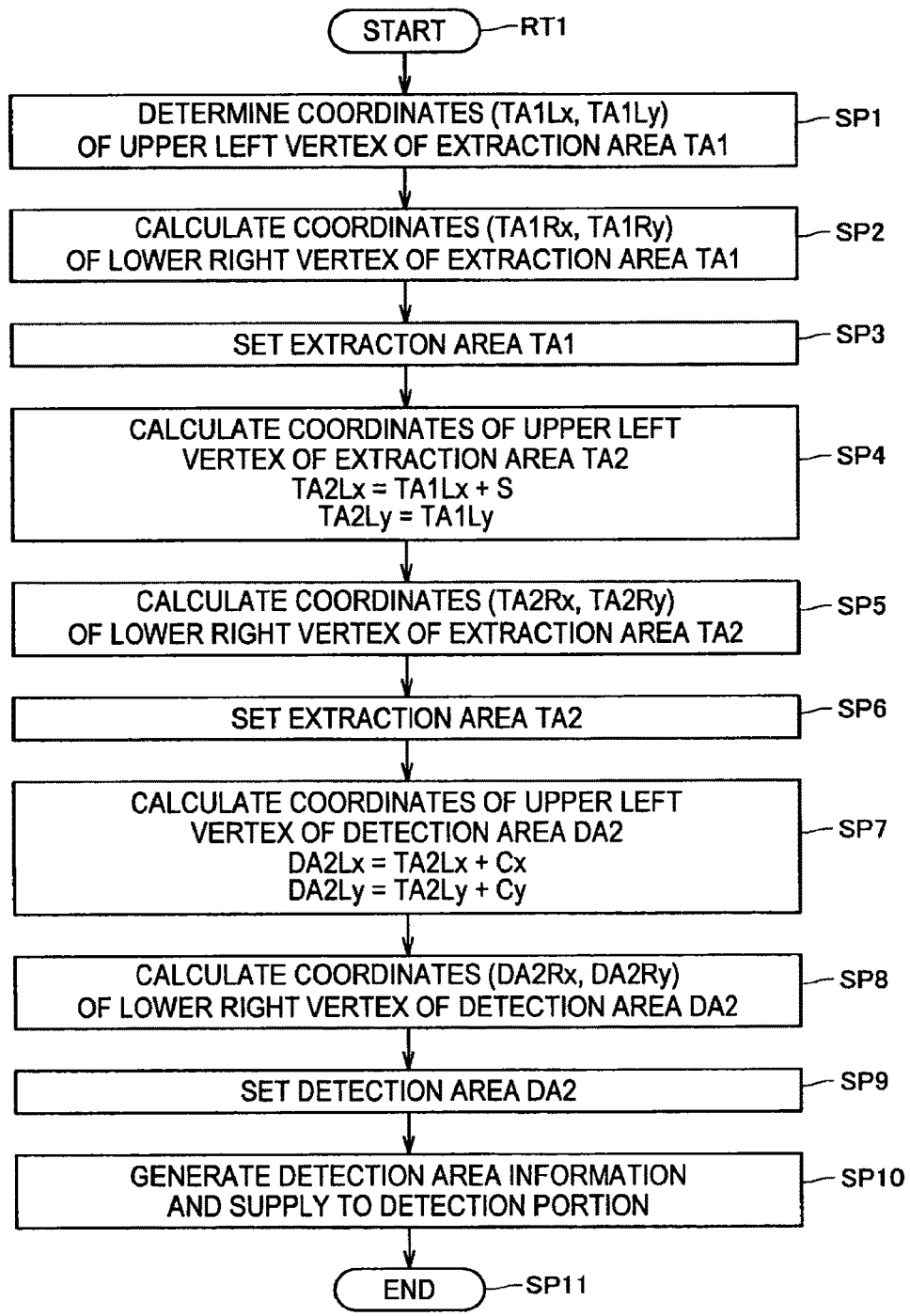
FIG. 6: RIGHT SIDE DETECTION AREA SETTING PROCESSING PROCEDURE ACCORDING TO FIRST EMBODIMENT

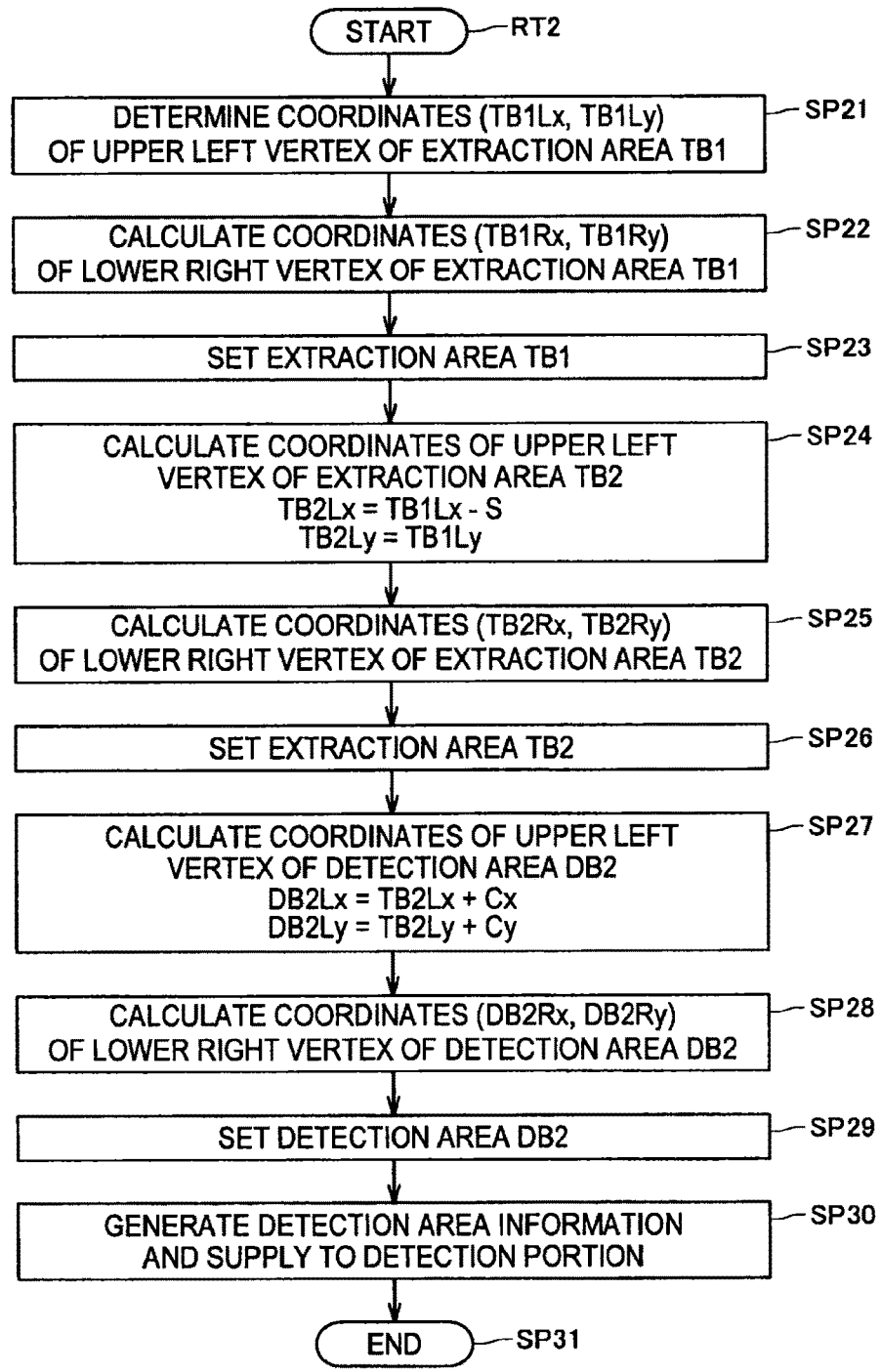
FIG. 7: LEFT SIDE DETECTION AREA SETTING PROCESSING PROCEDURE ACCORDING TO FIRST EMBODIMENT

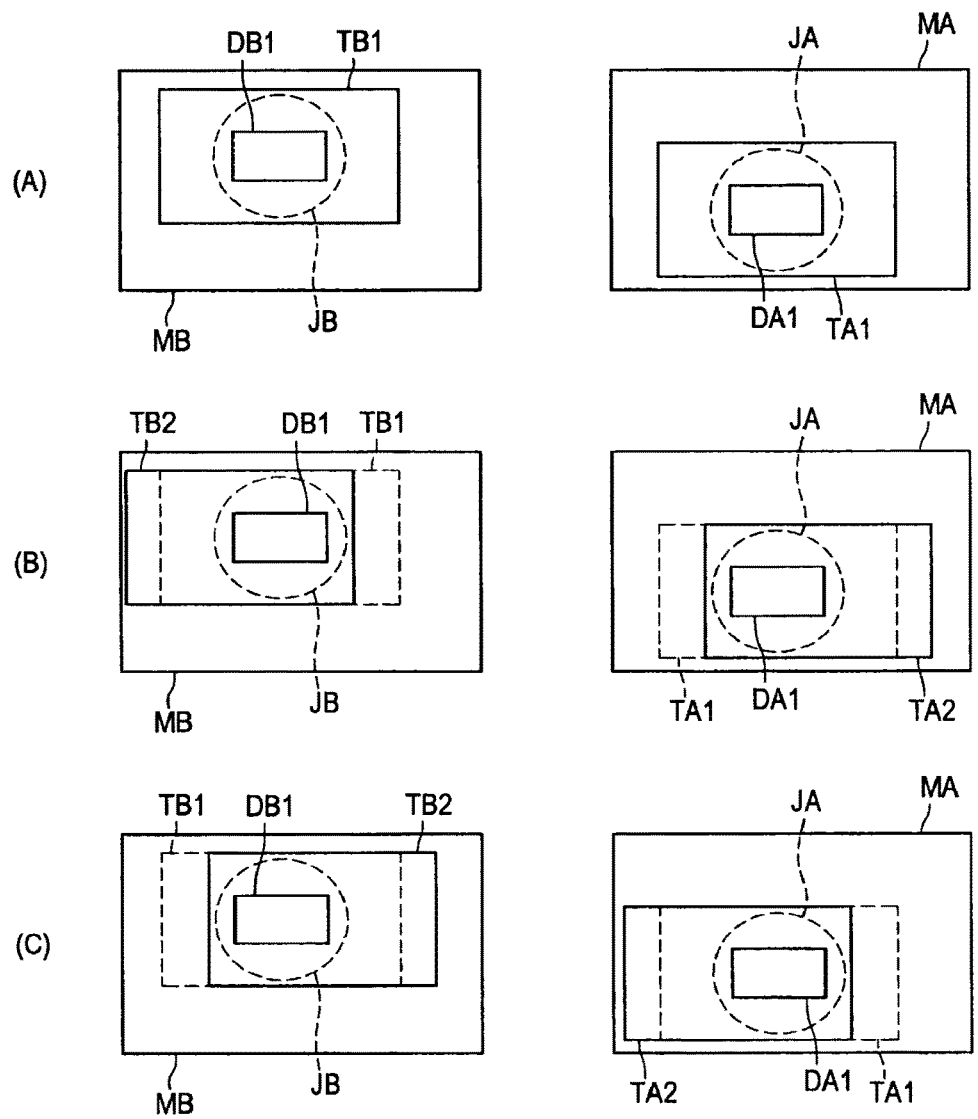
FIG. 8: EXTRACTION AREA AND DETECTION AREA OF IMAGE ACCORDING TO SECOND EMBODIMENT

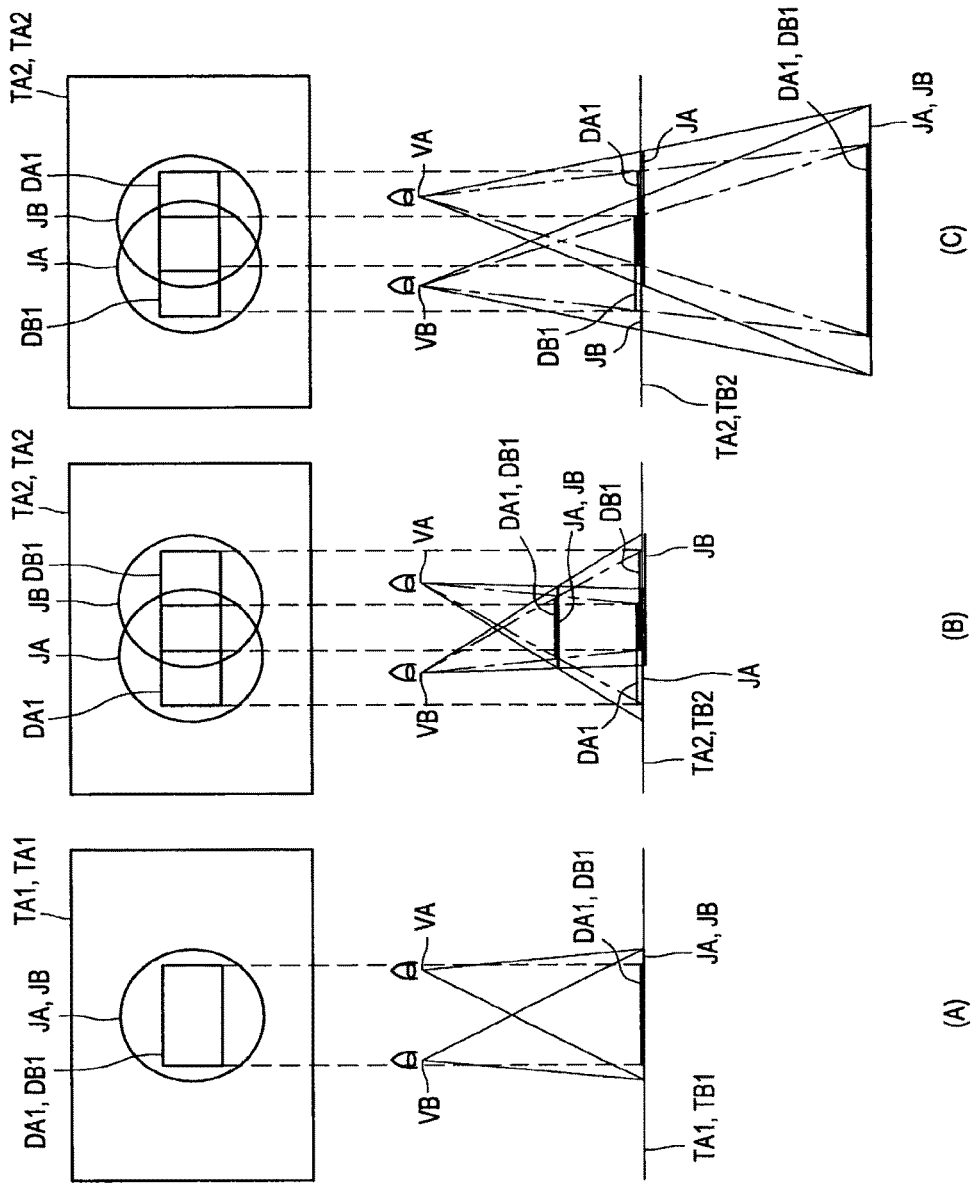
FIG. 9: RELATIONSHIP BETWEEN IMAGE AND DETECTION AREA ACCORDING TO SECOND EMBODIMENT

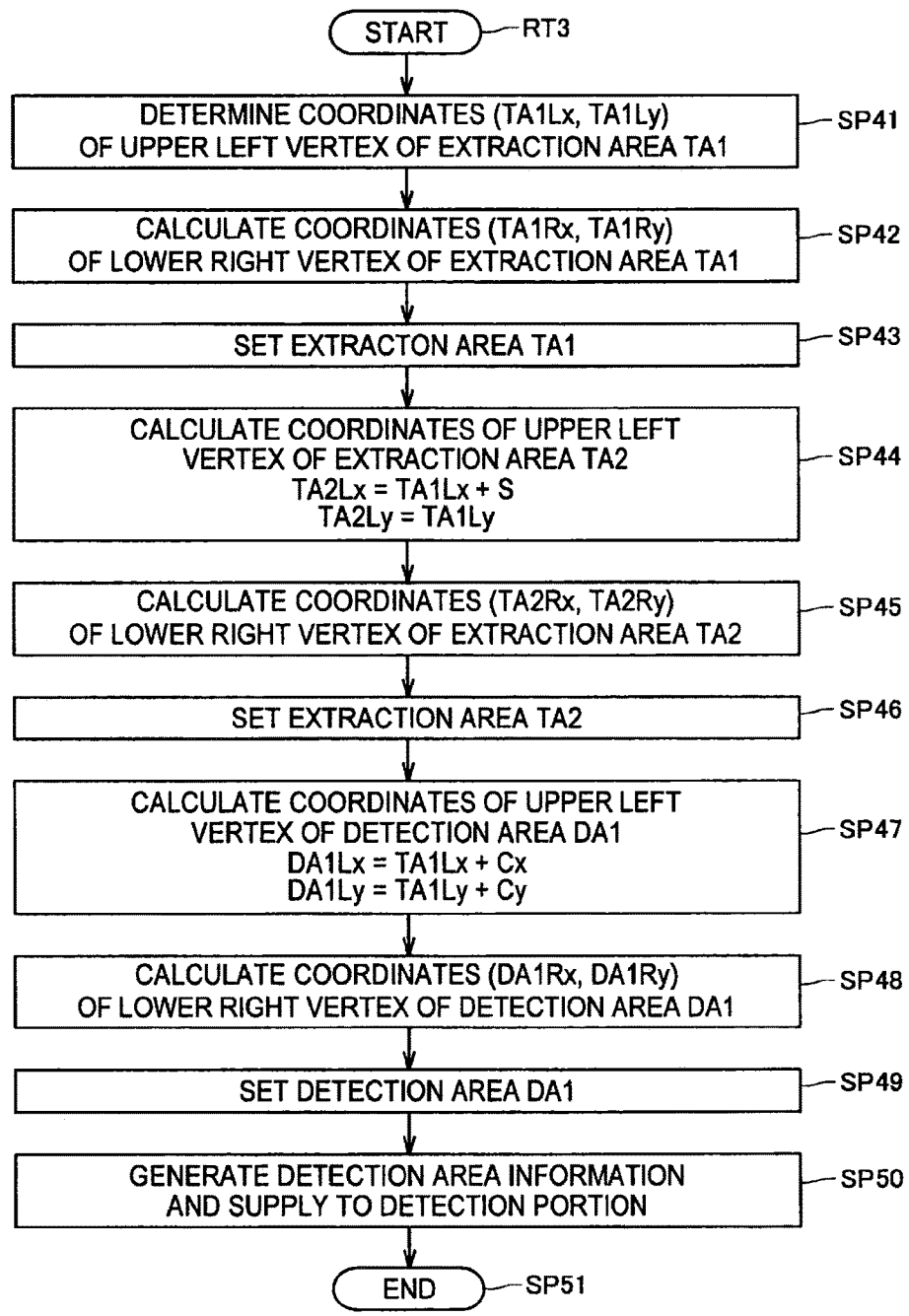
FIG. 10: RIGHT SIDE DETECTION AREA SETTING PROCESSING PROCEDURE ACCORDING TO SECOND EMBODIMENT

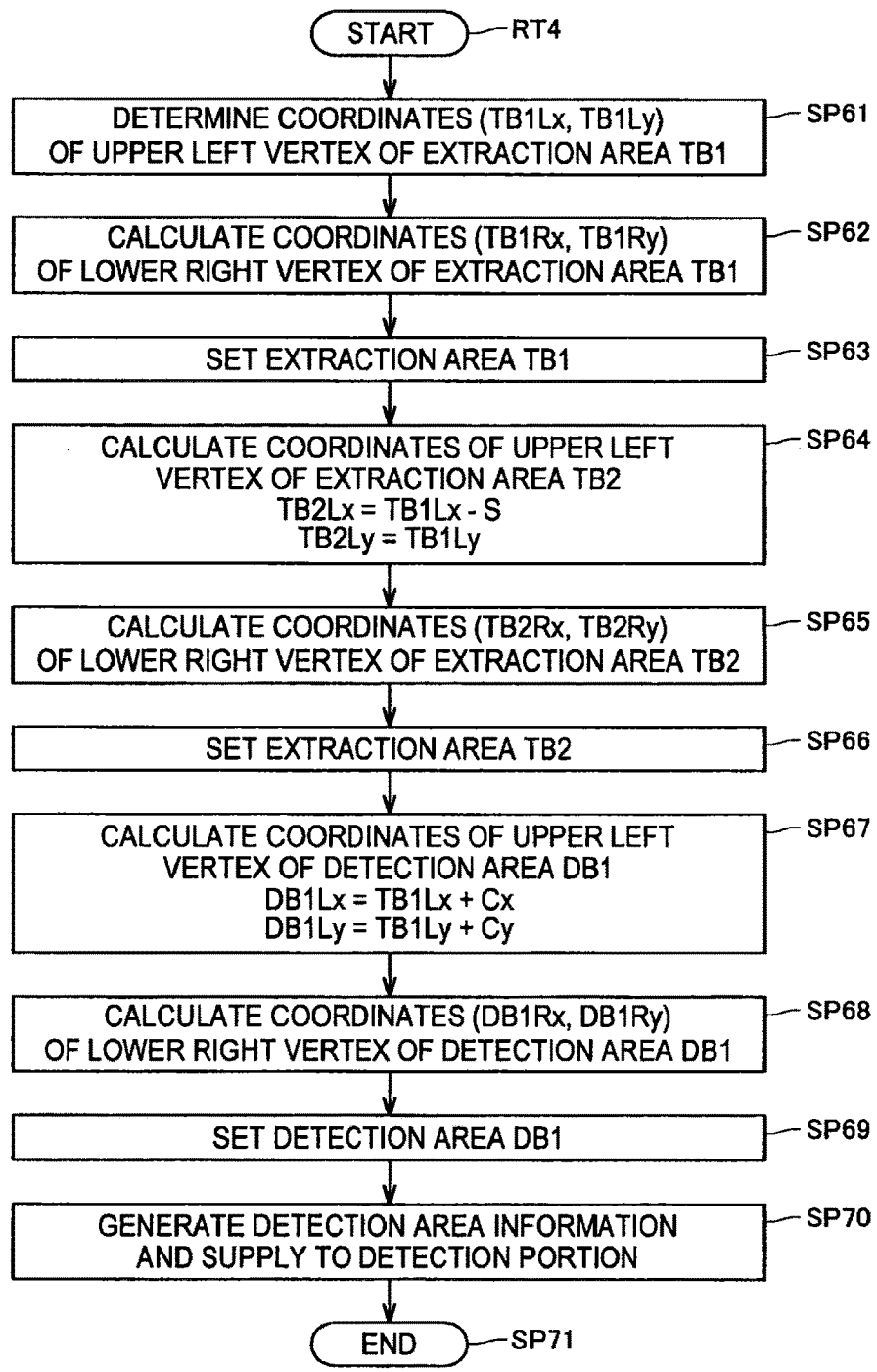
FIG. 11: LEFT SIDE DETECTION AREA SETTING PROCESSING PROCEDURE ACCORDING TO SECOND EMBODIMENT

IMAGE PROCESSING DEVICE, IMAGE PROCESSING METHOD AND IMAGE PROCESSING COMPUTER PROGRAM PRODUCT

CROSS-REFERENCE TO RELATED APPLICATIONS

This application is a continuation of and claims the benefit under 35 U.S.C. § 120 from U.S. patent application Ser. No. 15/002,059, filed Jan. 20, 2016, which is a continuation of U.S. patent application Ser. No. 13/579,072, filed Aug. 15, 2012, now U.S. Pat. No. 9,282,318, the entire contents of each of which is incorporated herein by reference. U.S. patent application Ser. No. 13/579,072 is a National Stage Application of PCT Application No. PCT/JP2012/001818, filed Mar. 15, 2012, which claims the benefit of priority under 35 U.S.C. § 119 to Japanese Patent Application No. 2011-080386, filed Mar. 31, 2011.

TECHNICAL FIELD

The present disclosure relates to an image processing device, an image processing method and an image processing computer program product that are suitably applied to a compound eye imaging device that captures so-called stereoscopic images using, for example, two cameras.

BACKGROUND ART

In recent years, a method is proposed that obtains a stereoscopic effect using stereoscopic viewing (stereovision) in which images of two viewpoints, namely left and right (stereoscopic images) are seen, respectively, by the left and right eye.

As a method to generate image signals used in the stereoscopic viewing, compound eye imaging is known, in which two cameras are arranged on the left and the right, and images of the two viewpoints are captured, respectively.

On the other hand, with respect to a normal imaging device using one camera, a method is known in which a central portion of a screen based on image signals is segmented in a rectangular shape as a detection area (detection frame) (refer to Patent Literature 1, for example). With this type of imaging device, predetermined arithmetic processing is applied to values of pixel signals included in the detection area, a signal for image adjustment is thus generated for automatic focus etc. and the image is actually adjusted based on that signal.

CITATION LIST

Patent Literature

[PTL 1]
JP H11-98407A

SUMMARY

Technical Problem

However, when performing compound eye imaging, it is conceivable that detection areas are set for each of images captured using two cameras, for example, signals for image adjustment are generated using the values of the pixel signals included in each of the detection areas, and each of the images are then adjusted.

At this time, it is assumed that each of the detection areas is set to be in a central section of each of the images. For example, when a specific imaging target (subject) is positioned in the center of each of the images, each of the detection areas is set such that they are all matched up with the subject.

Meanwhile, in a stereoscopic image, it is known to be possible to adjust a degree of the stereoscopic effect, which is obtained by adjusting areas of images that are mutually captured by two cameras, namely, by adjusting a degree of displacement between captured areas.

However, when the captured areas are displaced, the position of the detection areas on the screen does not change from the central section of the screen, and thus the detection areas are displaced from the subject. As a result, there is a risk that a focus cannot be aligned on the subject.

In this type of compound eye imaging, when the captured area is changed in accordance with adjustment of the stereoscopic effect, there is a problem that the image cannot be appropriately adjusted.

The present disclosure has been made in light of the above-described problems, and provides an image processing device, an image processing method and an image processing program that are capable of appropriately adjusting a plurality of respective images.

Solution to Problem

In one exemplary embodiment, an image processing device including a detection area setting device that sets a first detection area within a first imaging area and sets a second detection area in a second imaging area after a displacement adjustment is applied to at least one of the first imaging area and the second imaging area. The first detection area being an area used in image adjustment processing.

According to one aspect of the embodiment, the image processing device, further includes a displacement adjustment mechanism that compensates for optical misalignment between a first imaging unit and a second imaging unit.

According to another aspect of the embodiment, the image processing device, further includes a zoom lens; and a lens control portion. The displacement adjustment mechanism compensates for optical misalignment caused by zoom adjustment of the zoom lens.

According to another aspect of the embodiment, the image processing device, further includes a storage device. Adjustment amounts used by the displacement adjustment mechanism to adjust for misalignment are predetermined and stored in the storage device.

According to another aspect of the embodiment, the adjustment amounts are optical axis correction amounts, and the storage device stores the optical axis correction amounts in an optical axis correction table.

According to another aspect of the embodiment, the image processing device, further includes the first imaging unit and the second imagining unit, wherein the first imaging unit, the second imagining unit, and the detection area setting device are part of a compound eye imaging device.

According to another aspect of the embodiment, the image adjustment processing being one of focus control, exposure control and white balance control.

According to another aspect, the first detection area is positioned in a center of the first imaging area, and the second detection area is positioned in a center of the second imaging area.

According to another aspect, the detection area setting device sets a third imaging area and a forth imaging area, the third imaging area being an area created by moving the first imaging area in a horizontal direction, and a fourth imaging area being an area created by moving the second imaging area in an opposite horizontal direction, an amount of movement for the first imaging area and the second imaging area corresponding to a stereoscopic effect.

According to a method embodiment, the method includes applying a displacement adjustment to at least one of a first imaging area and a second imaging area, and setting with a detection area setting device, a first detection area within the first imaging area, and a second detection area in the second imaging area. The first detection area being an area used in image adjustment processing.

One aspect of this embodiment is that it may include compensating for optical misalignment between a first imaging unit and a second imaging unit with a displacement adjustment mechanism.

Another aspect is that it may include adjusting a zoom on a zoom lens. The compensating includes compensating for optical misalignment caused by the adjusting of the zoom.

Another aspect is that it may include storing in a storage device adjustment amounts used by the displacement adjustment mechanism to adjust for misalignment between the first imaging unit and the second imagining unit.

Another aspect is that the adjustment amounts are optical axis correction amounts, and the storage device stores the optical axis correction amounts in an optical axis correction table.

Another aspect is that the image adjustment processing being one of focus control, exposure control and white balance control.

According to another aspect, the first detection area as positioned in a center of the first imaging area, and the second detection area is positioned in a center of the second imaging area.

According to another aspect, the setting includes setting a third imaging area and a forth imaging area, the third imaging area being an area created by moving the first imaging area in a horizontal direction, and a fourth imaging area being an area created by moving the second imaging area in an opposite horizontal direction, an amount of movement for the first imaging area and the second imaging area corresponding to a stereoscopic effect.

In a non-transitory computer readable storage device embodiment that has instructions stored thereon that when executed by a processing circuit implement an image processing method, the method includes applying a displacement adjustment to at least one of a first imaging area and a second imaging area; and setting with a detection area setting device a first detection area within the first imaging area, and a second detection area in the second imaging area. The first detection area being an area used in image adjustment processing.

According to one aspect of the embodiment, the embodiment includes compensating for optical misalignment between a first imaging unit and a second imaging unit with a displacement adjustment mechanism.

Another aspect is that it may include adjusting a zoom on a zoom lens. The compensating includes compensating for optical misalignment caused by the adjusting of the zoom.

Another aspect is that it may include storing in a storage device adjustment amounts used by the displacement adjustment mechanism to adjust for misalignment between the first imaging unit and the second imagining unit.

Another aspect is that the adjustment amounts are optical axis correction amounts, and the storage device stores the optical axis correction amounts in an optical axis correction table.

Another aspect is that the image adjustment processing being one of focus control, exposure control and white balance control.

According to another aspect, the first detection area is positioned in a center of the first imaging area, and the second detection area is positioned in a center of the second imaging area.

According to another aspect, the setting includes setting a third imaging area and a forth imaging area, the third imaging area being an area created by moving the first imaging area in a horizontal direction, and a fourth imaging area being an area created by moving the second imaging area in an opposite horizontal direction, an amount of movement for the first imaging area and the second imaging area corresponding to a stereoscopic effect.

Advantageous Effects of Invention

According to the present disclosure, it is possible to adjust each of images using an image signal that is extracted taking a first area as reference, irrespective of a degree of stereoscopic effect, because it is possible to set a second area in accordance with the stereoscopic effect that is wished to be conveyed while also being possible to set a detection area based on the first area, without reference to the second area. Thus, the present disclosure can realize an image processing device, an image processing method and an image processing program that are capable of appropriately adjusting a plurality of respective images.

BRIEF DESCRIPTION OF DRAWINGS

FIG. 1 is a schematic diagram that shows an overall configuration of a compound eye imaging device.

FIG. 2 is a schematic diagram that shows a hardware configuration of a system controller.

FIG. 3 is a schematic diagram that shows a functional configuration of the system controller and a digital signal processing portion.

FIG. 4 is a schematic diagram that shows extraction areas and detection areas of images according to a first embodiment.

FIG. 5 is a schematic diagram that shows relationships between images and detection areas according to the first embodiment.

FIG. 6 is a flowchart that shows a right side detection area setting processing procedure according to the first embodiment.

FIG. 7 is a flowchart that shows a left side detection area setting processing procedure according to the first embodiment.

FIG. 8 is a schematic diagram that shows extraction areas and detection areas of images according to a second embodiment.

FIG. 9 is a schematic diagram that shows relationships between images and detection areas according to the second embodiment.

FIG. 10 is a flowchart that shows a right side detection area setting processing procedure according to the second embodiment.

FIG. 11 is flowchart that shows a left side detection area setting processing procedure according to the second embodiment.

DESCRIPTION OF EMBODIMENTS

Hereinafter, preferred embodiments to practice the present disclosure (hereinafter referred to as embodiments) will be described with reference to the appended drawings. Note that the description will be given in the order shown below.
1. First embodiment (example of setting detection area in accordance with optical axis adjustment and parallax adjustment)
2. Second embodiment (example of setting detection area in accordance with optical axis adjustment only)
3. Other embodiments

1. First Embodiment

1-1. Configuration of Compound-Eye Imaging Device

A compound-eye imaging device 1 shown in FIG. 1 generates image signals of two systems that form a stereoscopic image, by performing compound-eye imaging in which a specific imaging target is captured while controlling two imaging units 3A and 3B using a control unit 2.

The control unit 2 has a system controller 5 that comprehensively controls the whole, an operation portion 6 that receives operations from a user, and a display portion 7 that displays various pieces of information.

As shown in FIG. 2, the system controller 5 is formed centrally of a CPU (Central Processing Unit) 11, to which a ROM (Read Only Memory) 12, a RAM (Random Access Memory) 13 and a non-volatile memory 14 are connected via a bus 15.

The CPU 11 reads out various programs from the ROM 12 and the non-volatile memory 14, such as a specific basic program and a multiple image adjustment control program, and executes these programs while using the RAM 13 as a working memory and so on.

It should be noted that the non-volatile memory 14 stores values required for image adjustment processing, such as focus control and exposure control for the imaging units 3A and 3B, respectively, and various values used in control of the imaging units 3A and 3B.

The CPU 11 transmits various control signals etc. to each portion of the imaging units 3A and 3B via a communication interface (I/F) 16, and also acquires various pieces of information from each of the portions of the imaging units 3A and 3B.

The operation portion 6 (FIG. 1) is formed of various operation buttons or a touch panel, for example, and generates an operation signal in accordance with content of a user operation and supplies the generated operation signal to the system controller 5.

The operation portion 6 is provided with, for example, an imaging button that starts or stops imaging processing, cursor buttons that operate various menus, a zoom lever that adjusts a ratio of an image, and a parallax amount adjustment dial that adjusts an amount of left and right parallax in order to change a sense of depth during stereoscopic viewing.

The display portion 7 is formed of a liquid crystal panel, for example, and displays a display screen based on a display signal supplied from the system controller 5, thereby presenting to the user images captured by the imaging units 3A and 3B and various pieces of information, such as various setting contents etc.

Based on control of the control unit 2, the imaging unit 3A captures an imaging target (not shown in the drawings) from a different viewpoint than the imaging unit 3B, and generates an image signal of one system. Note that the imaging unit 3A generates the image signal corresponding to the right eye.

Using an optical adjustment portion 20A, the imaging unit 3A optically adjusts imaging light obtained from the imaging target, and performs image capture using an imaging element 24A. Specifically, the imaging unit 3A uses a zoom lens 21A to scale up the imaging light at a specific zoom ratio, reduces the amount of the imaging light using an aperture 22A and adjusts a focus using a focus lens 23A.

At that time, the system controller 5 of the control unit 2 respectively controls, via a lens driver 31A, a zoom ratio of the zoom lens 21A, an aperture amount of the aperture 22A and a focus position of the focus lens 23A. Further, the system controller 5 controls a shutter speed of the imaging element 24A, via a timing generator 32A.

The imaging element 24A is, for example, a CMOS (Complementary Metal Oxide Semiconductor). Each pixel is provided with a color filter of a complementary color system or a primary color system, and the imaging element 24A generates an imaging signal in which each pixel is expressed by a color signal of a complementary color or a primary color. In actuality, the imaging element 24A generates an analog image signal VIA by performing photoelectric conversion on incident imaging light at an interval based on control of the timing generator 32A. The analog image signal VIA is supplied to an analog signal processing portion 25A.

After performing correlated double sampling on the image signal V1A, the analog signal processing portion 25A generates an image signal V2A by adjusting gain of the image signal VIA based on control of the system controller 5, and supplies the image signal V2A to an A/D (Analog/Digital) converter 26A.

The A/D converter 26A generates a digital image signal V3A by performing analog to digital conversion on the analog image signal V2A, and supplies the digital image signal V3A to a digital signal processing portion 27A.

The digital signal processing portion 27A is formed, for example, of a digital signal processor, and performs a variety of image adjustment processing on the image signal V3A based on the control of the system controller 5. The image adjustment processing that is performed here is, for example, white balance correction processing or gamma correction processing etc., and includes a variety of processing on the image signal after image capture.

In addition, the digital signal processing portion 27A extracts, from the image signal V3A, an image that is an area to be extracted as a final image (hereinafter referred to as an extraction area), generates this as an image signal V4A, and supplies the image signal V4A to a memory 8.

After temporarily storing the image signal V4A, the memory 8 supplies the image signal V4A to a storage portion 9. The storage portion 9 is, for example, an optical disk drive or a magnetic disk drive, or a flash memory or the like, and stores the image signals V4A that are sequentially supplied. Further, in accordance with a request from the system controller 5, the storage portion 9 reads out the stored image signal V4A and supplies it to the memory 8.

In addition, based on pixel values inside a specified area of the image expressed by the image signal V3A, the digital signal processing portion 27A generates a plurality of types of detection values that are used when adjusting the image signal V3A, and supplies the detection values to the system controller 5 (this will be explained in more detail later).

Based on these detection values, the system controller 5 performs various controls, such as zoom control, aperture control, focus control and shutter speed control etc., via the lens driver 31A and the timing generator 32A.

In this way, based on the control of the control unit 2, the imaging unit 3A captures the imaging target in the same manner as a general video camera or the like and generates the image signal V4A. Hereinafter, processing that generates the image signal V4A of the imaging target by the imaging unit 3A based on the control of the control unit 2 will also be referred to as single-eye imaging processing.

Meanwhile, the imaging unit 3B is formed in a similar manner to the imaging unit 3A, and captures the imaging target, based on the control of the control unit 2, from a slightly different position and direction than that of the imaging unit 3A. Thus, the imaging unit 3B generates an image signal V4B that corresponds to the image signal V4A. Note that the imaging unit 3B generates an image signal corresponding to the left eye.

At this time, by linking various controls of the imaging units 3A and 3B, such as the zoom control, the aperture control, the focus control and the shutter speed control, the control unit 2 performs compound-eye imaging control that comprehensively controls various adjustment values relating to the image signals V4A and V4B, such as focus position and exposure etc.

Thus, the image signals V4A and V4B generated by the imaging units 3A and 3B respectively form an image for the right eye and an image for the left eye that express a stereoscopic image.

Using the control unit 2 in this way, the compound-eye imaging device 1 controls the imaging units 3A and 3B in a linked manner, and performs compound-eye imaging processing, thus generating, respectively, the image signals V4A and V4B that express the stereoscopic image.

It should be noted that, in a manufacturing adjustment process etc. of the imaging units 3A and 3B, although optical axes of the optical adjustment portion 20A and an optical adjustment portion 20B are respectively adjusted such that imaging regions of the imaging element 24A and an imaging element 24B are mutually aligned, there are cases in which an adjustment error occurs.

When there is such an adjustment error, due to misalignment between the optical adjustment portions 20A and 20B, displacement between the respective imaging regions occurs in the imaging units 3A and 3B. When the zoom ratio of the zoom lens 21A and a zoom lens 21B is raised, namely when a high zoom ratio is set using the zoom lever of the operation portion 6, this type of displacement between the imaging regions appears even more clearly.

However, the displacement of the imaging regions can be substantially resolved by processing (hereinafter referred to as optical axis correction processing), in which extraction areas from the image signal V3A and an image signal V3B are each moved and the imaging regions of the final image signals V4A and V4B are roughly aligned with each other.

Here, in the manufacturing adjustment process of the compound-eye imaging device 1, a relationship between a set zoom ratio and an appropriate amount of movement of the extraction area (hereinafter referred to as an optical axis correction amount) is measured, and an optical axis correction table is generated that represents the relationship between the zoom ratio and the optical axis correction amount Then, the optical axis correction table is stored in the non-volatile memory 14 (FIG. 2) of the system controller 5.

1-2. Image Adjustment Processing

Next, adjustment processing of images expressed by the image signals V3A and V3B, which is performed by the system controller 5 of the control unit 2 and by the digital signal processing portion 27A and a digital signal processing portion 27B of the imaging units 3A and 3B, will be explained.

By executing specific imaging processing programs, the system controller 5 executes various functions internally, as shown in FIG. 3, for example. Further, the digital signal processing portions 27A and 27B are programmed in advance, and thus they are set to realize various functions shown in FIG. 3.

First, the system controller 5 respectively sets extraction areas of the image signals V3A and V3B, using an extraction/scaling control portion 40. Specifically, as the optical axis correction processing, optical axis correction control portions 41A and 41B of the extraction/scaling control portion 40 read out the optical axis correction table from the non-volatile memory 14, determine the optical axis correction amount according to the zoom ratio at that time, and set extraction areas TA1 and TB1 as first areas.

Here, as shown in FIG. 4 (A), original images MA and MB, which are whole areas of the images expressed by the image signals V3A and V3B, are schematically depicted as imaging targets JA and JB that correspond to each other.

In FIG. 4 (A), a relative position of the imaging target JA with respect to the original image MA, and a relative position of the imaging target JB with respect to the original image MB are mutually different. Meanwhile, the relative position of the imaging target JA with respect to the extraction area TA1 and the relative position of the imaging target JB with respect to the extraction area TB1 are both substantially central and match each other.

Next, based on the extraction area set by the optical axis correction processing, a parallax amount control portion 42 of the extraction/scaling control portion 40 once more sets an extraction area, so as to adjust a sense of depth during stereoscopic viewing of the image signals V4A and V4B. Hereinafter, this type of processing is also referred to as parallax amount adjustment processing.

More specifically, as shown in FIG. 4 (B) and FIG. 4 (C) that correspond to FIG. 4 (A), the parallax amount control portion 42 sets, as second areas, for example, extraction areas TA2 and TB2, in positions to which the extraction areas TA1 and TB1 have been respectively moved in the left-right direction in accordance with a parallax amount instructed by the parallax amount adjustment dial of the operation portion 6.

It should be noted that FIG. 4 (B) shows a case in which the imaging target is positioned further to the front than the display screen and FIG. 4 (C) shows a case in which the imaging target is positioned further to the rear than the display screen.

After that, an extraction area signal generation portion 43A of the extraction/scaling control portion 40 generates extraction area signals STA2 and STB2 that express the position and size etc. of the extraction areas TA2 and TB2. Then, the extraction area signal generation portion 43A supplies the extraction area signals STA2 and STB2 to detection area control portions 44A and 44B and to extraction/scaling portions 55A and 55B of the digital signal processing portions 27A and 27B, respectively.

In accordance with the supplied extraction area signal STA2, the detection area control portion 44A sets a rectangular detection area DA2 that has a predetermined size (FIG. 4 (B) and FIG. 4 (C)), in a position that is roughly at the center of the extraction area TA2.

The detection area DA2 represents an area, of the extraction area TA2 that is finally extracted, for which a degree of focusing and exposure should be optimally adjusted by focus control and exposure control. The detection area DA2 is also called a detection frame.

Further, the detection area DA2 is set in a position corresponding to the extraction area TA2 after the parallax amount adjustment processing. In other words, the detection area DA2 is set in a position that is different to the detection area DA1 which is assumed to be set corresponding to the extraction area TA1 before the parallax amount adjustment processing.

In a similar manner, the detection area control portion 44B sets a detection area DB2 roughly in the center of the extraction area TB2, in accordance with the supplied extraction area signal STB2.

Then, the detection area control portions 44A and 44B (FIG. 3) generate detection area signals SDA and SDB that express the position and size etc. of the detection areas DA2 and DB2, and supply the detection area signals SDA and SDB to detection portions 52A and 52B of the digital signal processing portions 27A and 27B, respectively.

On the other hand, the digital signal processing portion 27A amplifies the image signal V3A supplied from the A/D converter 26A (FIG. 1) using an amplifier 51A, and supplies the amplified image signal V3A to the detection portion 52A and a white balance adjustment portion 53A.

The detection portion 52A includes a sharpness detection portion 52A1, a luminance detection portion 52A2 and a color signal detection portion 52A3, and generates a plurality of various detection values, based on pixel values inside the detection area DA that is specified by the detection area signal SDA of the image signal V3A.

More specifically, by performing arithmetic processing, such as differentiation etc., on the pixel values of the pixels included in the detection area DA2 of the image signal V3A, the sharpness detection portion 52A1 generates a sharpness signal SSA, which expresses sharpness. The sharpness detection portion 52A1 supplies the sharpness signal SSA to a lens control portion 45.

Based on the sharpness signal SSA, the lens control portion 45 controls a position of the focus lens 23A, via the lens driver 31A, such that the sharpness of the section corresponding to the detection area DA2 of the image signal V3A is highest, namely, such that that section comes into focus.

The luminance detection portion 52A2 generates a luminance signal SBA by performing arithmetic processing, such as integration etc., with respect to luminance values of pixels included in the detection area DA2 of the image signal V3A. The luminance detection portion 52A2 supplies the generated luminance signal SBA to an exposure control portion 46.

Based on the luminance signal SBA, the exposure control portion 46 controls the aperture 22A, via the lens driver 31A, such that an exposure value of the section corresponding to the detection area DA2 of the image signal V3A is an optimal value. In addition, the exposure control portion 46 controls, via the timing generator 32A, the shutter speed of the imaging element 24A, and further controls an amplification gain of an amplifier 51A.

A color signal detection portion 52A3 generates a color signal SCA by performing specific arithmetic processing on pixel values of pixels included in the detection area DA2 of the image signal V3A, and supplies the color signal SCA to a white balance control portion 47.

Based on the color signal SCA, the white balance control portion 47 generates a white balance adjustment signal SWA, and supplies the white balance adjustment signal SWA to the white balance adjustment portion 53A. Based on the white balance adjustment signal SWA, the white balance adjustment portion 53A adjusts the white balance of the image signal V3A, and supplies the adjusted image signal V3A to a gamma correction portion 54A.

The gamma correction portion MA performs specific gamma correction processing on the image signal V3A, and supplies the processed image signal V3A to the extraction/scaling portion 55A. The extraction/scaling portion 55A generates the image signal V4A by extracting an area indicated by the extraction area signal STA2 of the image signal V3A, and supplies the image signal V4A to a memory 7.

Meanwhile, in correspondence to the digital signal processing portion 27A, the digital signal processing portion 27B generates a sharpness signal SSB, a luminance signal SBB and a color signal SCB, respectively, by a sharpness detection portion 52B1, a luminance detection portion 52B2 and a color signal detection portion 52B3 of the detection portion 52B.

Based on the sharpness signal SSB, the lens control portion 45 controls a position of a focus lens 23B, via a lens driver 31B, such that the sharpness of the section corresponding to the detection area DB2 of the image signal V3B is highest, namely, such that that section comes into focus.

At that time, the lens control portion 45 corrects a control signal that is supplied to the lens driver 31B for the left side, based on the sharpness signal SSA for the right side. The lens control portion 45 also corrects a control signal that is supplied to the lens driver 31A for the right side, based on the sharpness signal SSB for the left side.

Based on the luminance signal SBB, the exposure control portion 46 controls an aperture amount of an aperture 22B, via the lens driver 31B, such that an exposure value of the section corresponding to the detection area DB2 of the image signal V3B is an optimal value. In addition, the exposure control portion 46 controls, via a timing generator 32B, the shutter speed of the imaging element 24B, and further controls an amplification gain of an amplifier 51B.

At that time, similarly to the lens control portion 45, the exposure control portion 46 corrects control signals that are respectively supplied to the lens driver 31B, the timing generator 32B and to the amplifier 51B for the left side, based on the luminance signal SBA for the right side. In addition, the exposure control portion 46 also corrects control signals that are respectively supplied to the lens driver 31A, the timing generator 32A and the amplifier 51A for the right side, based on the luminance signal SBB for the left side.

Based on the color signal SCB, the white balance control portion 47 generates a white balance adjustment signal SWB, and supplies the white balance adjustment signal SWB to a white balance adjustment portion 53B.

At that time, the white balance control portion 47 corrects the white balance adjustment signal SWB that is supplied to the white balance adjustment portion 53B for the left side, based on the color signal SCA for the right side. In addition, the white balance control portion 47 also corrects the white balance adjustment signal SWA that is supplied to the white balance adjustment portion 53A for the right side, based on the color signal SCB for the left side.

The digital signal processing portion 27B amplifies the image signal V3B using the amplifier 51B, adjusts the white balance using the white balance adjustment portion 53B, and applies gamma correction processing by the gamma correction portion 54B and then supplies the image signal V3B to the extraction/scaling portion 55B. The extraction/scaling portion 55B generates the image signal V4B by extracting an area indicated by the extraction area signal STB2 of the image signal V3B, and supplies the image signal V4B to the memory 7.

In other words, with respect to each of the image signals V3A and V3B obtained by image capture, the imaging units 3A and 3B (FIG. 1) perform focus control, exposure control and white balance control, while placing importance on detection values of each of the detection areas DA2 and DB2 and also taking into consideration the detection values of the image signal on the other side.

In this way, in the compound-eye imaging device 1, the extraction areas TA2 and TB2 are set by the optical axis correction processing and by the parallax amount adjustment processing and, at the same time, the detection areas DA2 and DB2 are set. Then, various detection values, such as sharpness etc. are generated from the pixel values etc. within the detection areas DA2 and DB2. Then, based on the various generated detection values, the compound-eye imaging device 1 performs processing that adjusts the image, such as focus control and exposure control etc. (hereinafter referred to collectively as imaging adjustment processing), and thus the compound-eye imaging device 1 generates the image signals V4A and V4B that express the stereoscopic image.

1-3. Relationship Between Imaging Target and Position of Detection Areas

Here, a relationship will be explained between a stereoscopic effect that is obtained when a viewer stereoscopically views an image of the image signals V4A and V4B using a television device or the like, and a position of the detection areas.

Generally, when stereoscopically viewing images using a television device, the image signals V4A and V4B are alternately displayed on the television device one frame or one field at a time. The viewer puts on glasses, and left and right lenses of the glasses are alternately blocked in synchronization with the images, by liquid crystal shutters or the like.

By doing this, within a front display screen, the viewer sees only the image based on the image signal V4A with his/her right eye and, at the same time, sees only the image based on the image signal V4B with his/her left eye.

FIG. 5 (A) to FIG. 5 (C) schematically show this state, and images displayed on display screens are shown in an upper section and positional relationships between the viewer's eyes, the display screens and obtained images are shown in a lower section respectively along with detection areas. The extraction areas TA1 and TB1, or the extraction areas TA2 and TB2 are displayed on the whole of the display screen.

FIG. 5 (A) corresponds to FIG. 4 (A) and shows positional relationships between viewpoints VA and VB of the viewer, the extraction areas TA1 and TB1 when only the optical axis correction processing has been performed, the imaging targets JA and JB, and the detection areas DA1 and DB1. In this case, the detection areas DA1 and DB1 are aligned with each other on the display screen.

FIG. 5 (B) corresponds to FIG. 4 (B) and shows a case in which, in addition to the optical axis correction processing, the parallax amount adjustment processing has been performed such that the image appears to be positioned to the front. In this case, the imaging targets JA and JB are displaced to the left and the right on the display screen, and thus the viewer subconsciously tries to overlap the imaging targets JA and JB in his/her brain, and a stereoscopic effect can thus be obtained in which the image is to the front.

Here, as the detection areas DA2 and DB2 are matched to the imaging targets JA and JB, respectively, the image signals V4A and V4B are adjusted such that the focus and the exposure etc. are matched with the imaging targets in each of the left and right images. For that reason, the imaging targets appear vividly to the viewer and the viewer can enjoy images that have a sense of depth.

FIG. 5 (C) corresponds to FIG. 4 (C) and shows a case in which, in addition to the optical axis correction processing, the parallax amount adjustment processing is performed such that the image appears to be positioned to the rear. In this case, the imaging targets are displaced to the left and to the right in opposite directions to those of FIG. 5 (B) and therefore, a stereoscopic effect can be imparted to the viewer in which the image is to the rear. In this case, the imaging targets appear vividly to the viewer and the viewer can perceive images that have a sense of depth.

1-4. Detection Area Setting Processing Procedure

Next, detection area setting processing procedures RT1 and RT2, which are used in the compound-eye imaging device 1 when respectively setting the right side and left side detection areas DA2 and DB2, will be explained with reference to flowcharts shown in FIG. 6 and FIG. 7. It should be noted that either the right side detection area setting processing procedure RT1 or the left side detection area setting processing procedure RT2 may be processed first, or parallel processing may be performed.

Furthermore, for explanatory purposes, coordinates within the screen take the top left of the screen as an origin point, an x axis is set is a direction from the left toward the right and a y axis is set in a direction from the top toward the bottom. In addition, the extraction areas TA and the detection areas DA are expressed by coordinates of their top left and bottom right vertices.

When the imaging processing is started, the CPU 11 of the system controller 5 starts the right side detection area setting processing procedure RT1 (FIG. 6) and moves to step SP1.

At step SP1, the CPU 11 reads out the optical axis correction table from the non-volatile memory 14 using the optical axis correction control portion 41A, and determines the right side optical axis correction amount in accordance with the zoom ratio at this time. Then, the CPU 11 determines coordinates (TA1Lx, TA1Ly) expressing the upper left vertex based on the optical axis correction amount, and moves to the next step SP2.

At step SP2, the CPU 11 calculates coordinates (TA1Rx, TA1Ry) expressing the lower right vertex in accordance with a specific arithmetic expression that is based on the coordinates (TA1Lx, TA1Ly) expressing the upper left vertex of the extraction area TA1 and on the zoom ratio set by the zoom lever of the operation portion 6, and then moves to the next step SP3.

At step SP3, the CPU 11 sets the extraction area TA1 with the coordinates (TA1Lx, TA1Ly) and the coordinates (TA1Rx, TA1Ry) as the upper left vertex and the lower right vertex, respectively, and moves to the next step SP4.

At step SP4, using the parallax amount control portion 42, the CPU 11 calculates, using the following Formula (1), coordinates (TA2Lx, TA2Ly) expressing the upper left vertex of the extraction area TA2, based on the upper left vertex (TA1Lx, TA1Ly) of the set extraction area TA1 and on an adjustment amount S that is set in accordance with the parallax amount, and then moves to the next step SP5.

$$TA2Lx = TA1Lx + S$$

$$TA2Ly = TA1Ly \tag{1}$$

At step SP5, the CPU 11 calculates coordinates (TA2Rx, TA2Ry) expressing the lower right vertex in accordance with a specific arithmetic expression that is based on the coordinates (TA2Lx, TA2Ly) expressing the upper left vertex of the extraction area TA2 and on the zoom ratio set using the zoom lever of the operation portion 6, and then moves to the next step SP6.

At step SP6, the CPU 11 sets the extraction area TA2 with the coordinates (TA2Lx, TA2Ly) and the coordinates (TA2Rx, TA2Ry) as the upper left vertex and the lower right vertex, respectively, and moves to the next step SP7.

At step SP7, using the detection area control portion 44A, the CPU 11 calculates, using the following Formula (2), coordinates (DA2Lx, DA2Ly) expressing the upper left vertex of the detection area DA2, based on the upper left vertex (TA2Lx, TA2Ly) of the extraction area TA2 and on a constant (Cx, Cy), and then moves to the next step SP8. Here, the constant (Cx, Cy) is a value that is established based on a difference between the sizes of the extraction area TA2 and the detection area DA2.

$$DA2Lx = TA2Lx + Cx$$

$$DA2Ly = TA2Ly + Cy \qquad (2)$$

At step SP8, the CPU 11 calculates coordinates (DA2Rx, DA2Ry) expressing the lower right vertex in accordance with a specific arithmetic expression that is based on the coordinates (DA2Lx, DA2Ly) expressing the upper left vertex of the detection area DA2, and then moves to the next step SP9.

At step SP9, the CPU 11 sets the detection area DA2 with the coordinates (DA2Lx, DA2Ly) and the coordinates (DA2Rx, DA2Ry) as the upper left vertex and the lower right vertex, respectively, and moves to the next step SP10.

At step SP10, the CPU 11 generates detection area information SDA that represents the set detection area DA2, and supplies the detection area information SDA to the detection portion 52A. The CPU 11 then moves to the next step SP11, and ends the right side detection area setting processing procedure RT1.

Further, when the imaging processing is started, the CPU 11 of the system controller 5 starts the left side detection area setting processing procedure RT2 (FIG. 7) and moves to step SP21.

At step SP21, similarly to the right side, the CPU 11 reads out the optical axis correction table from the non-volatile memory 14 using the optical axis correction control portion 41B, and determines the left side optical axis correction amount in accordance with the zoom ratio at this time. Then, the CPU 11 determines coordinates (TB1Lx, TB1Ly) expressing the upper left vertex based on the optical axis correction amount, and moves to the next step SP22.

At step SP22 and step SP23, similarly to the case of the right side, the CPU 11 sets the extraction area TB1 after calculating coordinates (TB1Rx, TB1Ry) expressing the lower right vertex, and then moves to the next step SP24.

At step SP24, using the parallax amount control portion 42, the CPU 11 calculates, using the following Formula (3) in which some of the numerals are reversed from those for the right side, coordinates (TB2Lx, TB2Ly) expressing the upper left vertex of the extraction area TB2, based on the upper left vertex (TB1Lx, TB1Ly) of the set extraction area TB1 and on the adjustment amount S, and then moves to the next step SP25.

$$TB2Lx = TB1Lx - S$$

$$TB2Ly = TB1Ly \qquad (3)$$

At step SP25 and step SP26, similarly to the case of the right side, the CPU 11 sets the extraction area TB2 after calculating coordinates (TB2Rx, TB2Ry) expressing the lower right vertex, and then moves to the next step SP27.

At step SP27, similarly to the case of the right side, using the detection area control portion 44B, the CPU 11 calculates, using the following Formula (4), coordinates (DB2Lx, DB2Ly) expressing the upper left vertex of the detection area DB2, based on the upper left vertex (TB2Lx, TB2Ly) of the extraction area TB2 and on the constant (Cx, Cy), and then moves to the next step SP28.

$$DB2Lx = TB2Lx + Cx$$

$$DB2Ly = TB2Ly + Cy \qquad (4)$$

At step SP28 and step SP29, similarly to the case of the right side, the CPU 11 sets the extraction area DB2 after calculating coordinates (DB2Rx, DB2Ry) expressing the lower right vertex, and then moves to the next step SP30.

At step S30, the CPU 11 generates detection area information SDB that represents the set detection area DB2, and supplies the detection area information SDB to the detection portion 52B. The CPU 11 then moves to the next step SP31, and ends the left side detection area setting processing procedure RT2.

1-5. Operations and Effects

With the above-described configuration, the compound-eye imaging device 1 according to the first embodiment respectively sets the extraction areas TA1 and TB1 in the image signals V3A and V3B using the optical axis correction control portions 41A and 41B and by the optical axis correction processing in accordance with the zoom ratio at this time.

The parallax amount control portion 42 respectively sets the extraction areas TA2 and TB2 such that the extraction areas TA1 and TB1 are displaced in the left-right direction by the parallax amount adjustment processing in accordance with the stereoscopic effect that is wished to be imparted to the viewer.

The detection area control portions 44A and 44B respectively set the detection areas DA2 and DB2 such that the detection areas DA2 and DB2 are positioned substantially in the center of the extraction areas TA2 and TB2.

Then, after the detection portions 52A and 52B have generated the various detection values, such as sharpness etc., based on the pixel values inside the detection areas DA2 and DB2, the digital signal processing portions 27A and 27B perform the image adjustment processing, such as focus control, exposure control and the like.

As a result, the compound-eye imaging device 1 can position the imaging targets JA and JB in mutually corresponding positions in the image signals V4A and V4B, and can also optimize the focus and exposure for each of the imaging targets JA and JB. Thus, the stereoscopic image of the imaging targets can be vividly captured.

With the image signals V4A and V4B generated in this manner, it is possible to show a viewer who has seen the image of the image signals V4A and V4B via a specific display device, the vivid imaging targets for the right eye and the left eye, respectively. As a result, it is possible to impart an appropriate sense of depth with respect to the imaging targets.

In particular, the compound-eye imaging device 1 sets the detection areas DA2 and DB2 for the image signals V3A and V3B, respectively, and performs the image adjustment processing for each of the images while placing importance on each of the detection values generated from the pixel values inside the detection areas DA2 and DB2, respectively, while also taking other detection values into consideration.

As a result, the compound-eye imaging device 1 can capture the respective imaging targets extremely vividly, by respectively performing the image adjustment processing with respect to each of the left and right image signals, based on the detection values obtained from the pixel values within the detection areas of each of the image signals.

In addition, the compound-eye imaging device 1 can enhance the mutual correlativity of each of the left and right image signals by correcting each of the adjustment values etc. based on the detection values obtained from the image signal on the other side and can thus reduce a sense of discomfort arising from differences between the left and right images.

With the above-described configuration, the compound-eye imaging device 1 respectively sets the extraction areas TA1 and TB1 in the image signals V3A and V3B by the optical axis correction processing in accordance with the zoom ratio at this time, and further respectively sets the extraction areas TA2 and TB2 by the parallax amount adjustment processing in accordance with the stereoscopic effect that is wished to be imparted to the viewer. Then, the compound-eye imaging device 1 respectively sets the detection areas DA2 and DB2 in positions that are substantially in the center of the extraction areas TA2 and TB2, and, after the various detection values have been generated based on the pixel values within the detection areas DA2 and DB2, the compound-eye imaging device 1 performs the image adjustment processing, such as focus control, exposure control and the like. As a result, the compound-eye imaging device 1 can position the imaging targets JA and JB in mutually corresponding positions in the image signals V4A and V4B, and can respectively optimally control the focus and exposure in alignment with the imaging targets JA and JB. The compound-eye imaging device 1 can thus adjust for the vivid stereoscopic image.

2. Second Embodiment 2-1. Configuration of Compound-Eye Imaging Device

In comparison to the compound-eye imaging device 1 according to the first embodiment, a compound-eye imaging device 71 (FIG. 1) according to a second embodiment differs in that it has a system controller 75 in place of the system controller 5, while having a similar configuration in all other respects.

In comparison to the system controller 5, the system controller 75 (FIG. 3) differs in that it has an extraction/scaling control portion 80 and detection area control portions 84A and 84B in place of the extraction/scaling control portion 40 and the detection area control portions 44A and 44B.

The extraction/scaling control portion 80 has extraction area signal generation portions 83A and 83B in place of the extraction area signal generation portions 43A and 43B.

2-2. Detection Area Setting

As shown in FIG. 8 (A), which corresponds to FIG. 4 (A), similarly to the case of the extraction/scaling control portion 40, the optical axis correction control portions 41A and 41B of the extraction/scaling control portion 80 read out the optical axis correction table from the non-volatile memory 14, determine the optical axis correction amount according to the zoom ratio at that time, and set the extraction areas TA1 and TB1.

Further, as shown in FIG. 8 (B) and FIG. 8 (C) which correspond to FIG. 4 (B) and FIG. 4 (C), the parallax amount control portion 42 sets the final extraction areas TA2 and TB2, in positions to which the extraction areas TA1 and TB1 have been respectively moved in the left-right direction.

The extraction area signal generation portions 83A and 83B supply the extraction area signals STA2 and STB2, which express the position and size etc. of the extraction areas TA2 and TB2, to the extraction/scaling portions 55A and 55B of the digital signal processing portions 27A and 27B, respectively.

In addition, in contrast to the extraction area signal generation portions 43A and 43B, the extraction area signal generation portions 83A and 83B generate extraction area signals STA1 and STB1 that express the position and size of the extraction areas TA1 and TB1 before being re-set, and supply the extraction area signals STA1 and STB1 to the detection area control portions 84A and 84B.

In accordance with the supplied extraction area signal STA1, the detection area control portions 84A and 84B set the detection areas DA1 and DB1 (FIG. 8 (B) and FIG. 8 (C)) in positions that are substantially in the center of the extraction areas TA1 and TB1 before being re-set.

Then, the detection area control portions 84A and 84B (FIG. 3) generate the detection area signals SDA and SDB, which express the position and size etc. of the detection areas DA1 and DB1, and supply the detection area signals SDA and SDB to the detection portions 52A and 52B of the digital signal processing portions 27A and 27B, respectively.

Based on pixel values of pixels included within the detection areas DA1 and DB1 of the image signals V3A and V3B, the detection portions 52A and 52B generate various signals, such as a sharpness signal that expresses sharpness etc., and supply the various signals to the lens control portion 45, the exposure control portion 46 and the white balance control portion 47, respectively.

In response to this, based on the various signals generated from the pixel values of each of the detection areas DA1 and DB1, the lens control portion 45, the exposure control portion 46 and the white balance control portion 47 perform focus control, exposure control and white balance control.

In this way, the compound-eye imaging device 71 sets the detection areas DA1 and DB1 based on the extraction areas TA1 and TB1 that are set by the optical axis correction processing, namely, based on the extraction areas TA1 and TB1 before being re-set by the parallax amount adjustment processing, and generates the various detection values, such as sharpness etc., from the pixel values etc. within the detection areas DA1 and DB1. Then, by performing the image adjustment processing based on the various generated detection values, the compound-eye imaging device 71 generates the image signals V4A and V4B that express the stereoscopic image.

2-3. Relationship Between Imaging Target and Position of Detection Areas

Here, a relationship will be explained between a stereoscopic effect that is obtained when a viewer stereoscopically views an image of the image signals V4A and V4B using a television device or the like, and a position of the detection areas.

Similarly to FIG. 5 (A) to FIG. 5 (C), FIG. 9 (A) to FIG. 9 (C) schematically show a state in which the viewer sees only the image based on the image signal V4A with his/her right eye and, at the same time, sees only the image based on the image signal V4B with his/her left eye.

FIG. 9 (A) corresponds to FIG. 8 (A) and shows positional relationships between viewpoints VA and VB of the viewer, the extraction areas TA1 and TB1 when only the optical axis correction processing has been performed, the imaging targets JA and JB, and the detection areas DA1 and DB1. In this case, the detection areas DA1 and DB1 are aligned with each other on the display screen, similarly to FIG. 5 (A).

FIG. 9 (B) corresponds to FIG. 8 (B) and shows a case in which, in addition to the optical axis correction processing, the parallax amount adjustment processing has been performed such that the image appears to be positioned to the front, similarly to FIG. 5 (B). In this case, the imaging targets JA and JB are displaced to the left and the right on the display screen, and thus the viewer subconsciously tries to overlap the imaging targets JA and JB in his/her brain, and a stereoscopic effect can thus be obtained in which the image is to the front.

Here, in FIG. 9 (B), the detection areas DA1 and DB1 are aligned at a position in which the image appears to the front. This is because the detection areas DA1 and DB1 are set in the center of the extraction areas TA1 and TB1 after the optical axis correction processing. In other words, because the detection areas DA1 and DB1 are set to be mutually substantially in the center with respect to the imaging targets JA and JB, when the imaging targets JA and JB are aligned, the detection areas DA1 and DB1 are also aligned.

Thus, the alignment of the imaging targets JA and JB at the same time as the alignment of the detection areas DA1 and DB1 at a position in which the image appears to the front means that areas of the imaging targets JA and JB that are used as a reference for focus control and exposure control are also mutually aligned.

Specifically, with the image signals V4A and V4B generated according to the second embodiment, optimal image adjustment processing is performed on each of the imaging targets JA and JB, and thus it is possible to cause the viewer who is stereoscopically viewing those images to stereoscopically view the image of the extremely vivid imaging targets.

FIG. 9 (C) corresponds to FIG. 8 (C), and shows a case in which, in addition to the optical axis correction processing, the parallax amount adjustment processing is performed such that the image appears to be positioned to the rear, similarly to FIG. 5 (C). In this case, the imaging targets are displaced to the left and to the right in opposite directions to those of FIG. 9 (B) and a stereoscopic effect can be imparted to the viewer in which the image is to the rear. In this case, the imaging targets appear extremely vividly to the viewer and the viewer can perceive the image that has a sense of depth.

2-4. Detection Area Setting Processing Procedure

Next, detection area setting processing procedures RT3 and RT4, which are used in the compound-eye imaging device 71 when respectively setting the right side and left side detection areas DA1 and DB1, will be explained with reference to flowcharts shown in FIG. 10 and FIG. 11. It should be noted that either the right side detection area setting processing procedure RT3 or the left side detection area setting processing procedure RT4 may be processed first, or parallel processing may be performed.

When the imaging processing is started, the CPU 11 of the system controller 75 starts the right side detection area setting processing procedure RT3 (FIG. 10) and moves to step SP41. Note that processing at step SP41 to step SP46 is the same as the processing at step SP1 to step SP6 and an explanation is therefore omitted here.

At step SP47 to step SP50, the CPU 11 performs processing that replaces the detection area DA2 of step SP7 to step SP10 with the detection area DA1.

Specifically, at step SP47, using the detection area control portion 84A, the CPU 11 calculates, using the following Formula (5), coordinates (DA1Lx, DA1Ly) expressing the upper left vertex of the detection area DA1, based on the upper left vertex (TA1Lx, TA1Ly) of the set extraction area TA1 and on the constant (Cx, Cy), and then moves to the next step SP48.

$$DA1Lx = TA1Lx + Cx$$

$$DA1Ly = TA1Ly + Cy \qquad (5)$$

At step SP48, the CPU 11 calculates coordinates (DA1Rx, DA1Ry) expressing the lower right vertex in accordance with a specific arithmetic expression that is based on the coordinates (DA1Lx, DA1Ly) expressing the upper left vertex of the detection area DA1, and then moves to the next step SP49.

At step SP49, the CPU 11 sets the detection area DA1 with the coordinates (DA1Lx, DA1Ly) and the coordinates (DA1Rx, DA1Ry) as the upper left vertex and the lower right vertex, respectively, and moves to the next step SP50.

At step SP50, the CPU 11 generates detection area information SDA that represents the set detection area DA1, and supplies the detection area information SDA to the detection portion 52A. The CPU 11 then moves to the next step SP51, and ends the right side detection area setting processing procedure RT3.

Further, when the imaging processing is started, the CPU 11 of the system controller 75 starts the left side detection area setting processing procedure RT4 (FIG. 11) and moves to step SP61. Note that processing at step SP61 to step SP66 is the same as the processing at step SP21 to step SP26 and an explanation is therefore omitted here.

At step SP67 to step SP70, the CPU 11 performs processing that replaces the detection area DB2 of step SP27 to step SP30 with the detection area DB1. In other words, the CPU 11 performs processing that replaces the detection area DA1 of step SP47 to step SP50 with the detection area DB1.

Specifically, at step SP67, using the detection area control portion 84B, the CPU 11 calculates, using the following Formula (6), coordinates (DB1Lx, DB1Ly) expressing the upper left vertex of the detection area DB1, based on the upper left vertex (TB1Lx, TB1Ly) of the extraction area TB1 and on the constant (Cx, Cy), and then moves to the next step SP68.

$$DB1Lx = TB1Lx + Cx$$

$$DB1Ly = TB1Ly + Cy \qquad (6)$$

At step SP68 and step SP69, similarly to the case of the right side, the CPU 11 sets the detection area DB1 after calculating coordinates (DB1Rx, DB1Ry) expressing the lower right vertex, and then moves to the next step SP70.

At step SP70, the CPU 11 generates detection area information SDB that represents the set detection area DB1, and supplies the detection area information SDB to the detection portion 52B. The CPU 11 then moves to the next step SP71, and ends the left side detection area setting processing procedure RT4.

2-5. Operations and Effects

With the above-described configuration, the compound-eye imaging device 71 according to the second embodiment respectively sets the extraction areas TA1 and TB1 in the image signals V3A and V3B using the optical axis correction control portions 41A and 41B and by the optical axis correction processing in accordance with the zoom ratio at this time.

The parallax amount control portion 42 respectively sets the extraction areas TA2 and TB2 such that the extraction areas TA1 and TB1 are displaced in the left-right direction by the parallax amount adjustment processing in accordance with the stereoscopic effect that is wished to be imparted to the viewer.

The detection area control portions 84A and 84B respectively set the detection areas DA1 and DB1 such that the detection areas DA1 and DB1 are positioned substantially in the center of the extraction areas TA1 and TA2 which are obtained by the optical axis correction processing only, rather than the extraction areas TA2 and TB2 which are obtained by the parallax amount adjustment processing.

Then, after the detection portions 52A and 52B have generated the various detection values, such as sharpness etc., based on the pixel values inside the detection areas DA1 and DB1, the digital signal processing portions 27A and 27B perform the image adjustment processing, such as focus control, exposure control and the like.

As a result, the compound-eye imaging device 71 can position the imaging targets JA and JB in mutually corresponding positions in the image signals V4A and V4B, and can also optimize the focus and exposure for a location at which the imaging targets JA and JB are mutually aligned. Thus, the stereoscopic image of the imaging targets can be extremely vividly captured.

At this time, in the compound-eye imaging device 71, the detection areas DA1 and DB1 are respectively set in substantially the center of the extraction areas TA1 and TB1, namely in locations that are displaced from the center of the extraction areas TA2 and TB2 which are the areas that are actually extracted from the images.

For that reason, with the image signals V4A and V4B generated according to the second embodiment, at a stage of display on the display screen, the respective positions of the detection areas DA1 and DB1 are mutually displaced. However, when stereoscopic viewing takes place, the detection areas DA1 and DB1 can be aligned with the image of the imaging targets.

In particular, even when there is a large parallax amount and there is a significant amount of separation between the imaging target JA for the right eye and the imaging target JB for the left eye, when stereoscopic viewing takes place, the detection areas DA1 and DB1 can be overlapped at a position of the image of the imaging targets. As a result, the viewer who is stereoscopically viewing the image signals V4A and V4B can perceive the extremely vivid image with a sufficient sense of depth.

Further, in other points, the compound-eye imaging device 71 can achieve similar operational effects as the first embodiment.

With the above-described configuration, the compound-eye imaging device 71 respectively sets the extraction areas TA1 and TB1 in the image signals V3A and V3B by the optical axis correction processing in accordance with the zoom ratio, and further respectively sets the extraction areas TA2 and TB2 by the parallax amount adjustment processing in accordance with the stereoscopic effect that is wished to be imparted to the viewer. Then, the compound-eye imaging device 1 respectively sets the detection areas DA1 and DB1 in positions that are substantially in the center of the previously set extraction areas TA1 and TB1, and, after the various detection values have been generated based on the pixel values within the detection areas DA1 and DB1, performs the image adjustment processing, such as focus control, exposure control and the like. As a result, the compound-eye imaging device 71 can position the imaging targets JA and JB in mutually displaced positions in the image signals V4A and V4B, and can optimally perform focus and exposure respectively for a location in which the imaging targets JA and JB are mutually aligned. The compound-eye imaging device 71 can thus capture an exceptionally vivid stereoscopic image.

3. Other Embodiments

Note that, in the above-described embodiments, cases are described in which the detection values are generated from the pixel values of the pixels included in the detection areas and imaging light is optically changed as the image adjustment processing. Specifically, processing to adjust the focus position of the image and the exposure etc. is performed. However, the present disclosure is not limited to this example and any one of these adjustment processing may be performed, or, with respect to the image expressed by the image signal after image capture, adjustment processing that matches the image quality to the imaging target based on the detection values obtained from the pixel values of the pixels within the detection areas may be performed, such as contrast, gamma characteristics and color adjustment, for example.

Further, in the above-described embodiments, cases are described in which the extraction areas and the detection areas are set with respect to the image signals V3A and V3B that are captured by the imaging units 3A and 3B. However, the present disclosure is not limited to this example and image signals captured by another imaging device may be acquired and the extraction areas and detection areas may be set with respect to those image signals. In this case, a variety of image adjustment processing, such as white balance and contrast etc. can be performed on the image signals at a stage after the image signals are generated by an imaging element.

Further, in the above-described embodiments, cases are described in which the coordinates of the detection areas are calculated by arithmetic operation from the coordinates of the set extraction areas. However, the present disclosure is not limited to this example, and the detection areas may be set by a variety of methods. For example, the extraction areas may be divided up inside into a plurality of areas in a grid formation, and one or two or more of the areas may be set as the detection areas in accordance with the set extraction areas.

Further, in the above-described embodiments, cases are described in which the detection areas are set substantially in the center of the set extraction areas. However, the present disclosure is not limited to this example, and, in a case in which the imaging target is recognized to be part of a face by specific face recognition processing, for example, the detection areas may be set to be positioned on the eyes of the face, or the detection areas may be set on a chosen location with respect to the imaging target.

Furthermore, in the above-described embodiments, cases are described in which the optical axis correction table is stored in advance, the optical axis correction amount is determined in accordance with the set zoom ratio and the extraction areas TA1 and TB1 are set. However, the present disclosure is not limited to this example, and, using a specific imaging target specification portion, for example, mutually corresponding imaging targets may be respectively specified from the images expressed by the image signals V3A and V3B, and areas taking the position of the imaging targets as a reference may be set as the extraction areas TA1 and TB1, respectively. In addition, the extraction areas TA1 and TB1 may be set by performing image stabilization processing using a specific image stabilization processing portion, for example. In this way, the extraction areas TA1 and TB1 can be set using a variety of methods.

Further, in the above-described embodiments, cases are described in which the image signals V3A and V3B, which express the whole of the areas captured by the imaging elements 24A and 24B, are generated, and the image signals V4A and V4B are generated by extracting part of each of the whole areas using the extraction/scaling portions 55A and 55B, in accordance with the extraction area signals STA2 and STB2. However, the present disclosure is not limited to this example and by supplying the extraction area signals STA2 and STB2 to the imaging elements 24A and 24B, for example, part of the captured images may be extracted and the image signals V3A and V3B corresponding to the extraction areas TA2 and TB2 may be generated.

Further, in the above-described embodiments, cases are described in which the control unit 2 and the imaging units 3A and 3B have an integrated structure as the compound-eye imaging devices 1 and 71. However, the present disclosure is not limited to this example, and an independent control unit 2 may, for example, acquire image signals from two external imaging units and, at the same time, may supply various control signals to the external imaging units.

Further, in the above-described embodiments, cases are described in which the image signals V4A and V4B of the two systems are generated using the two imaging units 3A and 3B. However, the present disclosure is not limited to this example, and may be applied to a case in which, when capturing a hologram image, for example, a chosen number of two or more of the imaging units 3, such as three or eight of the imaging units 3, are used to concurrently generate the image signals of the same imaging target.

Further, in the above-described embodiments, cases are described in which the system controller 5 executes a specific imaging processing program and thus realizes the various functions shown in FIG. 3. However, the present disclosure is not limited to this example and the various functions may be realized by hardware.

Further, in the above-described embodiments, cases are described in which the digital signal processing portions 27A and 27B, which are formed by digital signal processors, are programmed in advance and thus realize the various functions shown in FIG. 3. However, the present disclosure is not limited to this example, and the various functions may be realized by hardware.

Further, in the above-described embodiments, cases are described in which the multiple image adjustment control program is stored in the non-volatile memory 14 in advance, and the extraction areas and the detection areas are set and the image signals are adjusted by reading out and executing this program. However, the present disclosure is not limited to this example, and a multiple image adjustment control program may be acquired from an external server or a host device etc. via a USB (Universal Serial Bus) connection or a LAN (Local Area Network) connection, and executed.

Further, in the above-described second embodiment, a case is described in which the compound-eye imaging device 71 is configured as the image processing device by the optical axis correction control portions 41A and 41B as a first area setting portion, the parallax amount control portion 42 as a second area setting portion, and the detection area control portions 84A and 84B as a detection area setting portion. However, the present disclosure is not limited to this example, and the image processing device may be configured by the first area setting portion, the second area setting portion and the detection area setting portion that are configured in various other ways.

It should be understood by those skilled in the art that various modifications, combinations, sub-combinations and alterations may occur depending on design requirements and other factors insofar as they are within the scope of the appended claims or the equivalents thereof.

It should be noted that the present disclosure can also take the following configurations.

(1)
An image processing device comprising:
a first area setting portion that sets a first area for each of images of two systems that are respectively captured from two different viewpoints;
a second area setting portion that, for each of the images of the two systems, sets a second area based on the first area, the second area being used to adjust a stereoscopic effect that is imparted during stereoscopic viewing; and
a detection area setting portion that, for each of the images of the two systems, sets a detection area based on the first area, the detection area being an area used to extract an image signal.

(2)
The image processing device according to (1),
wherein the first area setting portion respectively sets the first area while taking as reference a position of an imaging target in the images of the two systems.

(3)
The image processing device according to (2), further comprising:
an output image generation portion that generates an output image in accordance with an image signal obtained from the second area.

(4)
The image processing device according to (3),
wherein the output image generation portion adjusts the image signal obtained from the second area, in accordance with an image signal obtained from the detection area, and generates the output image.

(5)
The image processing device according to (2), further comprising:
an optical system control portion that changes a state of an optical system of an imaging portion in accordance with an image signal obtained from the detection area.

(6)
An image processing method comprising:
setting a first area for each of images of two systems that are respectively captured from two different viewpoints, the first area being set by a first area setting portion;
setting a second area based on the first area for each of the images of the two systems, the second area being used to adjust a stereoscopic effect that is imparted during stereoscopic viewing and being set by a second area setting portion; and
setting a detection area based on the first area for each of the images of the two systems, the detection area being an area used to extract an image signal that expresses the second area and being set by a detection area setting portion.

(7)
An image processing program that causes an information processing device to execute:
setting a first area for each of images of two systems that are respectively captured from two different viewpoints;
setting a second area based on the first area for each of the images of the two systems, the second area being used to adjust a stereoscopic effect that is imparted during stereoscopic viewing; and setting a detection area based on the first area for each of the images of the two systems, the detection area being an area used to extract an image signal that expresses the second area.

INDUSTRIAL APPLICABILITY

The present disclosure can be used in various business-use or household-use video cameras that perform compound-eye imaging, in digital still cameras or mobile telephones that have a moving image capture function, or in computer devices and the like.

REFERENCE SIGNS LIST 1, 71 Compound-eye imaging device
2 Control unit
3A, 3B Imaging unit
5, 75 System controller
11 CPU
20A, 20B Optical adjustment portion
21A, 21B Zoom lens
22A, 22B Aperture
23A, 23B Focus lens
24A, 24B Imaging element
25A, 25B Analog signal processing portion
27A, 27B Digital signal processing portion
31A, 31B Lens driver
32A, 32B Timing generator
40, 80 Extraction/scaling control portion
41A, 41B Optical axis correction control portion
42 Parallax amount control portion
43 Extraction area signal generation portion
44A, 44B, 84A, 84B Detection area control portion
45 Lens control portion
46 Exposure control portion
47 White balance control portion
52A, 52B Detection portion
52A1, 52B1 Sharpness detection portion
52A2, 52B2 Luminance detection portion
52A3, 52B3 Color signal detection portion
53A, 53B White balance adjustment portion
55A, 55B Extraction/scaling portion
V3A, V3B, V4A, V4B Image signal
JA, JB Imaging target
TA1, TA2, TB1, TB2 Extraction area
DA1, DA2, DB1, DB2 Detection area

The invention claimed is:

1. An image processing device comprising:
circuitry configured to
apply a displacement adjustment to a first image captured by a first imaging device and to a second image captured by a second imaging device to set a first extraction area and a second extraction area respectively;
set a first detection area within the first extraction area and set a second detection area within the second extraction area after the displacement adjustment is applied to the first image and the second image;
perform an image adjustment processing on the first extraction area based on pixel values in the first detection area; and
perform an image adjustment processing on the second extraction area based on pixel values in the second detection area, wherein
the first detection area is set on an imaging target in the first extraction area in case that the imaging target is not at a center of the first extraction area after the displacement adjustment is applied to the first image, and
the second detection area is set on the imaging target in the second extraction area in case that the imaging target is not at a center of the second extraction area after the displacement adjustment is applied to the second image.

2. The image processing device of claim 1, wherein the circuitry is configured to apply the displacement adjustment by compensating for optical misalignment between the first imaging device and the second imaging device.

3. The imaging processing device of claim 1, wherein
each of the first imaging device and the second imaging device includes a zoom lens, and
the circuitry is configured to control the zoom lens to compensate for optical misalignment caused by zoom adjustment of the zoom lens.

4. The imaging processing device of claim 2, further comprising a memory, wherein
adjustment amounts to compensate for the optical misalignment are predetermined and stored in the memory.

5. The imaging processing device of claim 4, wherein
the adjustment amounts are optical axis correction amounts, and
the memory stores the optical axis correction amounts in an optical axis correction table.

6. The imaging processing device of claim 1,
wherein the image adjustment processing is at least one of focus control, exposure control and white balance control.

7. An image processing method comprising:
applying a displacement adjustment to a first image captured by a first imaging device and a second image captured by a second imaging device to set a first extraction area and a second extraction area respectively;
setting, using circuitry, a first detection area within the first extraction area, and setting, using the circuitry, a second detection area within the second extraction area after the displacement adjustment is applied to the first image and the second image;
performing an image adjustment processing on the first extraction area based on pixel values in the first detection area; and
performing an image adjustment processing on the second extraction area based on pixel values in the second detection area, wherein
the first detection area is set on an imaging target in the first extraction area in case that the imaging target is not at a center of the first extraction area after the displacement adjustment is applied to the first image, and
the second detection area is set on the imaging target in the second extraction area in case that the imaging target is not at a center of the second extraction area after the displacement adjustment is applied to the second image.

8. The method of claim 7, wherein the applying the displacement adjustment includes compensating for optical misalignment between the first imaging device and the second imaging device.

9. The method of claim 8, further comprising:
adjusting a zoom on a zoom lens of an imaging system, wherein
the compensating includes compensating for optical misalignment caused by the adjusting of the zoom.

10. The method of claim 8, further comprising:
storing, in a memory, adjustment amounts to compensate for the optical misalignment.

11. The method of claim 10, wherein
the adjustment amounts are optical axis correction amounts, and
the memory stores the optical axis correction amounts in an optical axis correction table.

12. The method of claim 7, wherein the image adjustment processing is at least one of focus control, exposure control and white balance control.

13. An image processing system comprising:
a first imaging device configured to capture a first image;
a second imaging device configured to capture a second image; and
circuitry configured to
apply a displacement adjustment to the first image captured by the first imaging device and to the second image captured by the second imaging device to set a first extraction area and a second extraction area respectively;
set a first detection area within the first extraction area and set a second detection area within the second extraction area after the displacement adjustment is applied to the first image and the second image;
perform an image adjustment processing on the first extraction area based on pixel values in the first detection area; and
perform an image adjustment processing on the second extraction area based on pixel values in the second detection area, wherein
the first detection area is set on an imaging target in the first extraction area in case that the imaging target is not at a center of the first extraction area after the displacement adjustment is applied to the first image, and
the second detection area is set on the imaging target in the second extraction area in case that the imaging target is not at a center of the second extraction area after the displacement adjustment is applied to the second image.

* * * * *